(12) United States Patent
Narayanaswamy et al.

(10) Patent No.: US 8,789,173 B2
(45) Date of Patent: Jul. 22, 2014

(54) PROTECTING AGAINST DISTRIBUTED NETWORK FLOOD ATTACKS

(75) Inventors: Krishna Narayanaswamy, San Jose, CA (US); Bryan Burns, Portland, OR (US); Venkata Rama Raju Manthena, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1214 days.

(21) Appl. No.: 12/607,107

(22) Filed: Oct. 28, 2009

(65) Prior Publication Data

US 2011/0055921 A1 Mar. 3, 2011

Related U.S. Application Data

(60) Provisional application No. 61/239,690, filed on Sep. 3, 2009.

(51) Int. Cl.
*H04L 9/00* (2006.01)
*H04L 29/08* (2006.01)

(52) U.S. Cl.
USPC .......................................... 726/22; 709/224

(58) Field of Classification Search
USPC .......................................... 726/22; 709/224
See application file for complete search history.

(56) References Cited

U.S. PATENT DOCUMENTS

| | | | |
|---|---|---|---|
| 6,219,706 B1 | 4/2001 | Fan et al. | |
| 6,321,338 B1 | 11/2001 | Porras et al. | |
| 6,970,943 B1 | 11/2005 | Subramanian et al. | |
| 6,975,628 B2 | 12/2005 | Johnson et al. | |
| 7,162,740 B2 | 1/2007 | Eastlake, III | |
| 7,203,740 B1 | 4/2007 | Putzolu et al. | |
| 7,301,899 B2 | 11/2007 | Goldstone | |

(Continued)

FOREIGN PATENT DOCUMENTS

| | | | | |
|---|---|---|---|---|
| KR | WO2009064114 | * | 5/2009 | .............. G06F 21/20 |
| WO | 0221771 A1 | | 3/2002 | |
| WO | 2008002590 A2 | | 1/2008 | |
| WO | 2009064114 A2 | | 5/2009 | |

OTHER PUBLICATIONS

Mirkovic, "D-WARD: Source-End Defense Against Distributed Denial-of-Service Attacks," Chapter 6 "D-WARD," University of California, Los Angeles, 2003, 50 pp.

(Continued)

*Primary Examiner* — Jeffrey Pwu
*Assistant Examiner* — Samuel Ambaye
(74) *Attorney, Agent, or Firm* — Shumaker & Sieffert, P.A.

(57) ABSTRACT

A network security device performs a three-stage analysis of traffic to identify malicious clients. In one example, a device includes an attack detection module to, during a first stage, monitor network connections to a protected network device, during a second stage, to monitor a plurality of types of transactions for the plurality of network sessions when a parameter for the connections exceeds a connection threshold, and during a third stage, to monitor communications associated with network addresses from which transactions of the at least one of type of transactions originate when a parameter associated with the at least one type of transactions exceeds a transaction-type threshold. The device executes a programmed action with respect to at least one of the network addresses when the transactions of the at least one of the plurality of types of transactions originating from the at least one network address exceeds a client-transaction threshold.

25 Claims, 8 Drawing Sheets

(56) References Cited

U.S. PATENT DOCUMENTS

| | | | |
|---|---|---|---|
| 7,362,763 | B2 | 4/2008 | Wybenga et al. |
| 7,496,955 | B2 | 2/2009 | Akundi et al. |
| 7,743,144 | B1* | 6/2010 | Wright et al. ............... 709/225 |
| 7,849,502 | B1 | 12/2010 | Bloch et al. |
| 2002/0095492 | A1 | 7/2002 | Kaashoek et al. |
| 2002/0126621 | A1 | 9/2002 | Johnson et al. |
| 2002/0166063 | A1* | 11/2002 | Lachman et al. ............ 713/200 |
| 2003/0097557 | A1 | 5/2003 | Tarquini et al. |
| 2003/0110274 | A1 | 6/2003 | Pazi et al. |
| 2004/0015721 | A1 | 1/2004 | Eastlake, III |
| 2004/0044912 | A1* | 3/2004 | Connary et al. ............. 713/201 |
| 2004/0054925 | A1 | 3/2004 | Etheridge et al. |
| 2004/0107286 | A1 | 6/2004 | Larson et al. |
| 2004/0111635 | A1 | 6/2004 | Boivie et al. |
| 2004/0218532 | A1 | 11/2004 | Khirman |
| 2005/0039104 | A1 | 2/2005 | Shah et al. |
| 2005/0125195 | A1 | 6/2005 | Brendel |
| 2005/0144441 | A1 | 6/2005 | Govindarajan |
| 2005/0160289 | A1 | 7/2005 | Shay |
| 2006/0059550 | A1 | 3/2006 | Kausik |
| 2006/0075491 | A1 | 4/2006 | Lyon |
| 2006/0089994 | A1 | 4/2006 | Hayes |
| 2006/0185008 | A1 | 8/2006 | Le et al. |
| 2006/0288413 | A1 | 12/2006 | Kubota |
| 2007/0086336 | A1 | 4/2007 | Richards et al. |
| 2007/0107059 | A1 | 5/2007 | Chasin et al. |
| 2007/0180511 | A1 | 8/2007 | Eastlake, III |
| 2007/0294369 | A1 | 12/2007 | Ginter et al. |
| 2008/0080518 | A1 | 4/2008 | Hoeflin et al. |
| 2008/0101234 | A1* | 5/2008 | Nakil et al. ................. 370/235 |
| 2008/0147847 | A1 | 6/2008 | Pitkow et al. |
| 2008/0270154 | A1 | 10/2008 | Klots et al. |
| 2008/0307526 | A1 | 12/2008 | Chung et al. |
| 2009/0064337 | A1 | 3/2009 | Chien |
| 2009/0172815 | A1 | 7/2009 | Gu et al. |

OTHER PUBLICATIONS

Wang et al., "Detecting SYN Flooding Attacks," Proc. Infocom, 2002, 10 pp.

"Well-Known TCP Port Number," www.webopedia.com, 2004, 3 pp.

"TCP Packet Field Descriptions," www.ipanalyser.co.uk, Analyser Sales Ltd., Copyright 2003, 2 pp.

Egan, "Decomposition of a TCP Packet," www.passwall.com, Aug. 7, 2000, 4 pp.

Gibbs, "A Guide to Original SYN," www.nwfusion.com, Network World, Nov. 2000, 2 pp.

Egan, "Sample TCP/IP Packet," www.passwall.com, Version 0.0.0 @ 03:55/08.07.2000, Copyright 2002, 9 pp.

Bernstein, "SYN Cookies," http://cr.yp.to/syncookies.html, Oct. 2003, 3 pp.

Lemon, "Resisting SYN Flood DoS Attacks with a SYN Cache," http://people.freebsd.org/~jlemon/papers/syncache.pdf, 9 pp.

Staniford et al., "Practical Automated Detection of Stealthy Portscans," http://downloads.securityfocus.com/library/spice-ccs2000.pdf, 16 pp.

Juniper Networks, Inc., "Combating Bots and Mitigating DDoS Attacks", Juniper Networks, Inc., 2008, entire document, http://www.juniper.net/solutions/literature/solutionbriefs/351198.pdf., 8 pp.

U.S. Appl. No. 11/045,572, entitled "Compound Attack Detection in a Computer Network," filed Jan. 27, 2005.

U.S. Appl. No. 12/432,325, entitled "Detecting Malicious Network Software Agents," filed Apr. 29, 2009.

Mahoney, "Network Traffic Anomaly Detection Based on Packey Bytes," SAC 2003, ACM, 5 pp.

Nottingham et al., "HTTP Header Field Registrations," RFC 4229, Dec. 2005, 53 pp.

Office Action from U.S. Appl. No. 12/432,325, dated Nov. 23, 2011, 13 pp.

Response to Office Action dated Nov. 23, 2011, from U.S. Appl. No. 12/432,325, filed Feb. 21, 2012, 13 pp.

Siris et al., "Application of anomaly detection algorithms for detecting SYN flooding attacks," Computer Communications, vol. 29., No. 9, pp. 1433-1442, May 31, 2006 (published online Oct. 19, 2005).

European Search Report from application No. EP 10158645, dated Dec. 15, 2010, 6 pp.

Office Action from European patent application No. 10158645.1, dated Oct. 26, 2012, 4 pp.

First Office Action mailed Mar. 5, 2013 from the State Intellectual Property Office of P.R.C. in corresponding CN Application No. 201010235869.6, p. 17.

Response filed Feb. 8, 2013 to the EPO Communication dated Oct. 26, 2012 in corresponding EP Application No. 10158645.1, 12 pgs.

* cited by examiner

PROTECTING AGAINST DISTRIBUTED NETWORK FLOOD ATTACKS

This application claims the benefit of U.S. Provisional Application No. 61/239,690, filed Sep. 3, 2009, which is hereby incorporated by reference in its entirety.

TECHNICAL FIELD

This disclosure relates to computer networks and, more particularly, to prevention of attacks in computer networks.

BACKGROUND

A computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the network to different security vulnerabilities.

Conventional techniques for detecting network attacks use pattern matching. In particular, an intrusion detection system ("IDS") applies regular expressions or sub-string matches to detect defined patterns within a data stream. Multiple patterns may be used in an attempt to improve the accuracy of the attack detection. In order to improve the probability of detecting an attack, the IDS may attempt to identify the type of software application and protocol associated with the data stream. Based on the identification, the IDS selects the appropriate patterns to apply in order to detect a network attack, a term which is used herein to include viruses or other malicious activity.

Malicious users may implement network attacks at various layers of the Open Systems Interconnection (OSI) reference model. For example, denial of service (DoS) attacks have been implemented historically at layer three (network layer) or layer four (transport layer) of the OSI model. One such example is SYN flood attacks, where an attacker bombards a network server with synchronization (SYN) packets, which may result in an overflow in the number of open connections for the server. Similar attacks include ACK floods and reset (RST) attacks. These attacks take place below layer seven, also referred to as the application layer. Conventional techniques for blocking such attacks include detecting two or more consecutive SYN packets from the same originating device. In this manner, conventional techniques prevent attacks at lower layers of the OSI reference model.

Malicious users have recently developed network attacks that act at layer seven (application layer) of the OSI model. As one example, DoS attacks acting at the application layer, also referred to as flood attacks at the application layer, may involve one or more malicious entities such as automated software agents, e.g., bots, that continually issue requests that consume a large amount of a web server's resources. Such recent network attacks are more connection-based, in that the malicious software agents typically do not begin such a flood attack until after initializing a network session, e.g., by completing a TCP three-way handshake. Therefore, conventional methods used for preventing attacks that occur at lower layers, such as SYN floods, are ineffective at preventing these new malicious users or software agents from using more sophisticated method of flooding a server or other device. The network attacks may also be protocol-compliant, and therefore may be difficult to detect using mechanisms that look for protocol anomalies.

Malicious entities, such as users or software agents, may, alone or in combination with one or more other software agents, flood a server with requests for a service that consume a large amount of resources. Conventional approaches to protecting such a server typically disable the service or throttle access to the service to prevent the server from crashing. However, this may result in legitimate clients being unable to utilize the service. In some cases, such an approach may result in lost revenue or customer dissatisfaction.

SUMMARY

In general, this disclosure describes techniques for protecting against distributed network flood attacks. In particular, the techniques protect against distributed network flood attacks without disabling or throttling all access to a targeted service. The techniques of this disclosure are particularly applicable to flood attacks occurring at the application layer (layer seven). In general, this disclosure describes an intrusion detection and prevention (IDP) device that provides a three-stage analysis of communication sessions to identify and protect against network flood attacks occurring in the communication sessions. Any network security device may be configured to implement the techniques of this disclosure.

During a first stage, the IDP device monitors a number of ongoing communication sessions between network devices (also referred to as connections or packet flows), a number of incoming connection requests, and/or a rate of incoming connection requests. The IDP device determines a parameter associated with the monitored communication sessions, which (in various examples) corresponds to one or more of the number of connections, the number of connection requests, and/or the rate of incoming connection requests. When the IDP determines that the parameter, e.g., one or more of the number of connections, the number of connection requests, or the rate at which the connection requests are received, exceeds a threshold, the IDP begins a second stage of analysis.

During the second stage, the IDP determines a parameter associated with a number of requests for a given type of transaction (or resource). For example, a type of transaction may be identifiable by a unique function name, uniform resource locator (URL) or uniform resource identifier (URI), one or more protocol fields or entries of one or more protocol fields, or other identifier. The IDP determines whether the parameter, e.g., a number of requests for a particular type of transaction over a period of time (referred to as a "time tick"), exceeds a corresponding threshold. In some examples, the IDP is pre-configured with thresholds for each type of transaction, while in other examples, the IDP performs a learning stage to calculate thresholds for each type of transaction. When the parameter, e.g., the number of requests for at least one of the types of transactions, exceeds the threshold, the IDP enters a third stage of analysis. In some examples, the IDP determines whether an absolute number of transaction requests exceed the threshold, while in other examples, the IDP determines whether a rate at which the transaction requests are received exceeds the threshold.

During the third stage, the IDP determines a number of requests from each client issuing a request for the type of transaction(s) determined in the second stage to be above the threshold. That is, for a transaction type X, such as a protocol field or entry of the protocol field, requests for which the IDP determined exceeded a threshold for transaction type X, the IDP determines which clients are requesting transaction type X and how many requests for transaction type X each client issues. When a number of requests for transaction type X by a particular client exceed a corresponding threshold, the IDP performs a programmed action with respect to the client. For example, the IDP may be configured to perform one or more of the following actions: block further communications by the client, rate-limit communications by the client, broadcast the client's Internet protocol (IP) address to other devices, add the client's IP address to an access control list (ACL), send an alert including the client's IP address to an administrator, close the communication session for the client, send a close session message to the client, or other action.

In some examples, the IDP further maintains timers corresponding to the second and third stages. When the timer for the second stage expires, the IDP transitions back into the first stage, assuming that the parameter for the second stage is no longer above the threshold, and when the timer for the third stage expires, the IDP transitions back into the second stage, again assuming that the number of requests for transaction type X by a particular client no longer exceed a corresponding threshold. In some examples, the IDP transitions from the second stage back down to the first stage when the timer expires and/or when the parameter is no longer above the threshold, that is, based on ongoing communication traffic. In some examples, the IDP resets the timer for the third stage each time the programmed action is performed for a particular client. Likewise, when the IDP transitions from the third stage to the second stage, the IDP resets the second stage timer. Alternatively, in some examples, the IDP transitions from the third stage back to the first stage upon expiration of the timer. In some examples, when the IDP is in the third stage, and when the number of requests for transaction type X by a particular client fall behind corresponding threshold, the IDP transitions down to the second stage. Likewise, in some examples, the IDP transitions from the second stage to the first stage when the number of communication sessions to protected server fall behind corresponding threshold. In some examples, hysteresis is used to avoid thrashing of stage transitions around threshold values.

In some examples, the IDP performs analysis of incoming traffic from a plurality of client devices. In some examples, the IDP receives data from one or more devices external to the IDP device, such as edge devices (e.g., routers at the edge of a corresponding service provider network) or a sampling device within a network that maintains and/or analyzes network traffic. These devices, when used, send data to the IDP, such that the IDP is able to identify malicious clients or malicious network sessions accordingly.

In one example, a method includes monitoring, with a first network device, network connections to a second network device protected by the first network device, upon determining that a parameter associated with the monitored network connections exceeds a connection threshold, monitoring each of a plurality of types of transactions associated with the network connections, upon determining that a parameter associated with at least one of the plurality of types of transactions exceeds a corresponding transaction-type threshold, monitoring communications associated with network addresses from which transactions of the at least one of the plurality of types of transactions originate, and executing a programmed action with respect to at least one of the network addresses when the transactions of the at least one of the plurality of types of transactions originating from the at least one network address exceeds a corresponding client-transaction threshold.

In another example, a network device includes a network interface to receive packets of a plurality of network sessions to a protected network device, a computer-readable medium storing a connection threshold, a transaction-type threshold, and a client-transaction threshold, a control unit having one or more processors, a reassembly module executing within the control unit to re-assemble application-layer data for the plurality of network sessions, and an attack detection module executing within the control unit to monitor network connections for the plurality of network sessions to the protected network device, to monitor each of a plurality of types of transactions associated with the plurality of network sessions when a parameter associated with the monitored network connections exceeds the connection threshold, to monitor communications associated with network addresses from which transactions of the at least one of the plurality of types of transactions originate when a parameter associated with the at least one of the plurality of types of transactions exceeds the transaction-type threshold, and to execute a programmed action with respect to at least one of the network addresses when the transactions of the at least one of the plurality of types of transactions originating from the at least one network address exceeds the client-transaction threshold.

In another example, a system includes a plurality of client devices, wherein each of the plurality of client devices participate in one of a plurality of network sessions with the protected network device, and a network security device positioned between the protected network device and the plurality of client devices, wherein the network security device comprises a network interface to receive packets of the plurality of network sessions, a computer-readable medium storing a connection threshold, a transaction-type threshold, and a client-transaction threshold, a control unit having one or more processors, a reassembly module executing within the control unit to re-assemble application-layer data for the plurality of network sessions, and an attack detection module executing within the control unit to monitor network connections for the plurality of network sessions to the protected network device, to monitor each of a plurality of types of transactions associated with the plurality of network sessions when a parameter associated with the monitored network connections exceeds the connection threshold, to monitor communications associated with network addresses from which transactions of at least one of the plurality of types of transactions originate when a parameter associated with the at least one of the plurality of types of transactions exceeds the transaction-type threshold, and to execute a programmed action with respect to at least one of the network addresses when the transactions of the at least one of the plurality of types of transactions originating from the at least one network address exceeds the client-transaction threshold.

In another example, a computer-readable medium, such as a computer-readable storage medium, contains, e.g., is encoded with, instructions that cause a programmable processor to monitor network connections to a protected network device, upon determining that a parameter associated with the connections exceeds a connection threshold, monitor each of a plurality of types of transactions associated with the network connections, upon determining that a parameter associated with the at least one of the plurality of types of transactions exceeds a corresponding transaction-type threshold, monitor communications associated with network addresses from which transactions of the at least one of the plurality of types of transactions originate, and execute a programmed action with respect to at least one of the network addresses when the transactions of the at least one of the plurality of types of transactions originating from the at least one network address exceeds a corresponding client-transaction threshold.

The techniques of this disclosure may present one or more advantages. For example, the techniques of this disclosure are generally scalable, adaptable, and flexible. The techniques allow for different levels of monitoring, from coarse-grained to fine-grained monitoring. The techniques scale well because, although at each stage the depth of analysis may increase, the amount of traffic subject to examination decreases. An IDP implementing these techniques also is generally adaptable in that the IDP is able to automatically identify relevant data that needs to be monitored. Although in some examples a user manually configures expected hit rates for the threshold values, in other examples, the IDP sets these values dynamically. Moreover, the techniques of this disclosure are applicable to any networking protocol, so long as a protocol decoder is available. The techniques provide protection against flood attacks even when the attacks are protocol-compliant, for example, even in cases where an attacker has successfully completed a three-way handshake and established a connection.

The techniques of this disclosure may result in blocking individual malicious entities, client devices, or software agents from accessing a service without preventing general access to the service by other non-malicious entities. That is, the techniques of this disclosure may block access by the malicious entities, client devices, or software agents to a particular service without disabling the service for non-malicious entities. This may allow for better security without degrading the quality of service provided to legitimate entities.

The details of one or more examples are set forth in the accompanying drawings and the description below. Other features, objects, and advantages will be apparent from the description and drawings, and from the claims.

DETAILED DESCRIPTION

Figure 1:
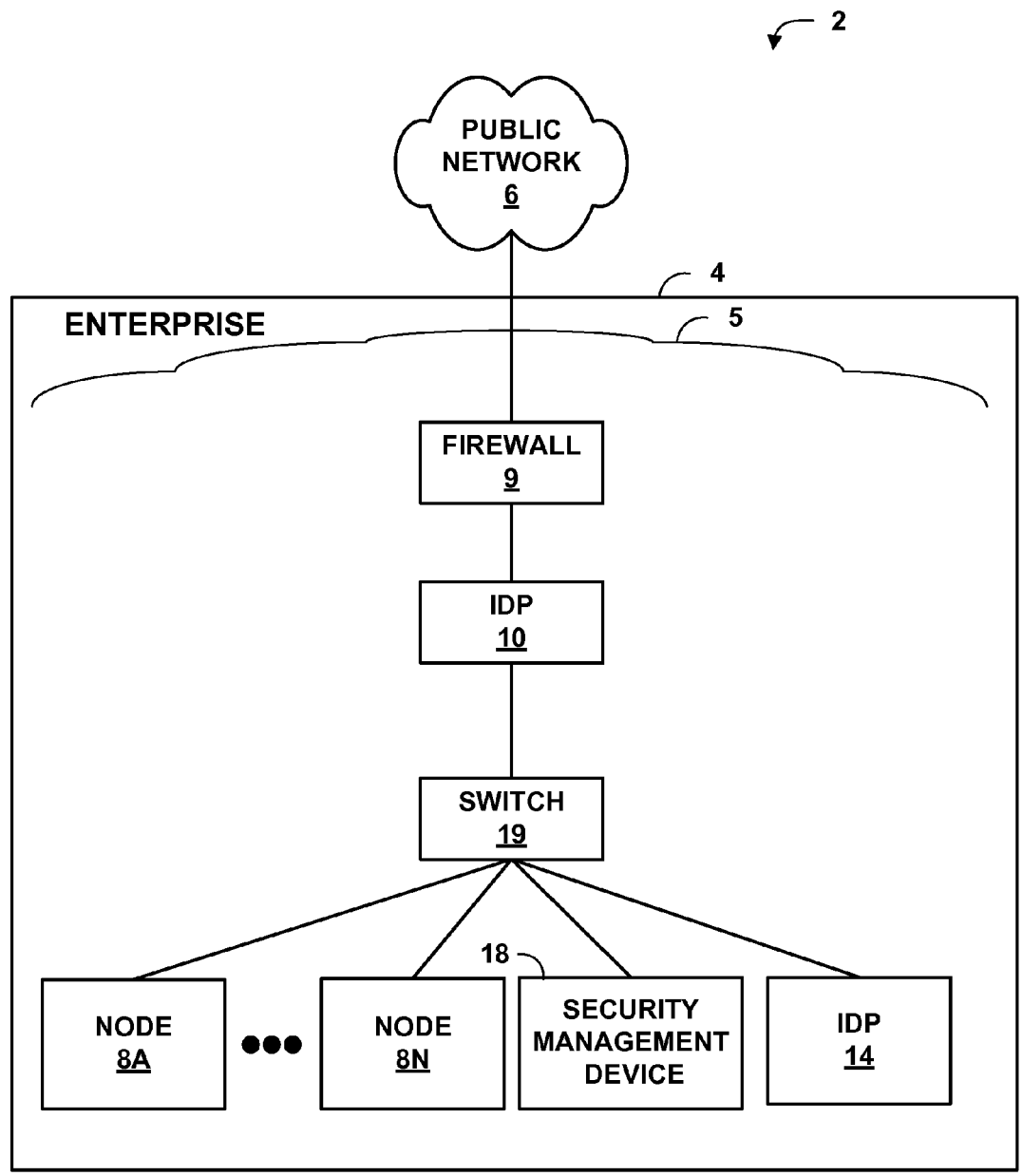
FIG. 1 is a block diagram illustrating an exemplary enterprise computer network in which an intrusion detection and prevention (IDP) device attempts to prevent flood attacks by malicious entities, such as malicious automated software agents.

FIG. 1 is a block diagram illustrating an exemplary enterprise computer network 4 in which an intrusion detection and prevention (IDP) device 10 attempts to prevent flood attacks by malicious entities, such as malicious automated software agents, in accordance with the techniques of this disclosure. Although described primarily with respect to IDP device 10, it should be understood that the techniques of this disclosure may be implemented by any of a variety of different network devices. For example, a network device including a service plane for coupling a generic security service card including an implementation of these techniques or a service card that specifically implements these techniques can achieve the techniques of this disclosure. Gateway devices, routers, hubs, firewalls, and servers are examples of network devices that may include such service planes. Also, any network security device may implement the techniques of this disclosure. The term "bots" as used herein refers to automated software agents, which typically perform malicious or otherwise unwanted behaviors. Although this disclosure generally refers to an IDP device, an intrusion detection system (IDS) or intrusion prevention system (IPS) can be configured with similar techniques. In the example of FIG. 1, IDP 10 is a single network device. In other examples, any of firewall 9, switch 19, security management device 18, IDP 14, or individual ones of nodes 8A-8N, or other devices, such as routers, virtual private network (VPN) appliances or gateways, may perform the functions described with respect to IDP 10.

Network 4 includes a private enterprise computing network 5 that is coupled to public network 6, such as the Internet. Public network 6 may include, for example, one or more client computing devices. Firewall 9 protects private enterprise network 5 and, in particular, internal computing nodes 8A-8N (computing nodes 8). Computing nodes 8 represent any private computing device within enterprise network 5, for example, workstations, laptops, file servers, print servers, database servers, web servers, e-mail servers, databases, printers, personal digital assistants (PDAs), smart phones, and other devices. Security management device 18 manages one or more network security devices of enterprise network 5, e.g., IDP 10, firewall 9, IDP 14, or one or more of computing nodes 8. In one example, security management device 18 implements the simple network management protocol (SNMP) to modify settings of the network security devices. In another example, security management device 18 implements a Device Management Interface (DMI). Switch 19 directs network traffic to and from destinations within enterprise network 5, e.g., one of computing nodes 8, security management device 18, IDP 14, and IDP 10.

In the example of FIG. 1, enterprise network 5 includes IDP 10 that monitors traffic flowing between firewall 9 and internal computing nodes 8. In particular, IDP 10 detects flood attacks, in accordance with the techniques of this disclosure, at the application layer (layer seven) of the Open Systems Interconnection (OSI) networking model. That is, IDP 10 is able to detect and prevent flood attacks at the application layer, in addition to detecting and preventing lower-layer flood attacks, such as SYN flood attacks. IDP 10 attempts to determine whether network communications from one or more devices represent a network attack. IDP 10 generally monitors various traffic statistics in three stages. Example traffic statistics include a number of active connections, a rate at which connection requests are received, a rate at which transaction requests for active connections are received, and individual transaction requests on a per-client basis. IDP 10 can also perform proxy handling, in that IDP 10 performs protocol analysis that provides information on a client's true IP address. Therefore, client profiling can be performed on the client's true IP address, rather than a proxy's IP address.

During a first stage, IDP 10 monitors one or more of a number of active communication sessions, a rate at which connection requests are received, and a number of connection requests. The first stage is also referred to in this disclosure as the service monitoring stage. IDP 10 calculates a parameter associated with the monitored network connections, the parameter comprising one or more of the number of active communication sessions, the rate at which connection requests are received, and the number of connection requests. When IDP 10 determines that the parameter, e.g., the number of communication sessions, the number of connection requests, and/or the rate at which connection requests are received, exceeds a corresponding connection threshold, IDP 10 enters the second stage. During the second stage, IDP 10 monitors individual types of transactions that occur during each of the communication sessions over a particular period of time. IDP 10 calculates a parameter associated with the types of transactions, the parameter comprising a number of transactions for each of the types of transactions over a particular time period or a rate at which transactions for each of the types of transactions are received during a particular time period. IDP 10 compares numbers of transactions of each type to corresponding thresholds (e.g., averages) for transactions of that type. When, for at least one of the types of transactions, IDP 10 determines that the number of transactions exceeds the average for that type, IDP 10 enters the third stage. During the third stage, IDP 10 monitors each of the clients performing the type of transaction that caused IDP 10 to enter the third stage over a particular time period. In particular, IDP 10 counts the number of times each client performs the transactions of that type over a particular time period and compares the numbers for each client to a client-transaction threshold. In this manner, the techniques of this disclosure may combine aspects of both rate-based and signature-based techniques to detect and prevent application layer attacks.

When IDP 10 determines that a particular client is performing transactions of the type that caused IDP 10 to enter the third stage, IDP 10 executes a programmed response with respect to that client. The programmed response may include one or more of blocking the client (permanently or for a period of time, e.g., a number of minutes), closing the communication session associated with the client, e.g., by sending a close-session message to the client and/or to the server participating in the communication session, dropping packets of the communication session, recording an Internet protocol (IP) address associated with the client, blocking future connection attempts from the client, rate limiting future sessions from the client, and broadcasting or advertising the IP address of the client to one or more other network devices (not shown in FIG. 1) to cause those network devices to block the client.

IDP 10, in some examples, additionally integrates pattern matching with application- and protocol-specific anomaly detection to identify sophisticated attack behaviors. In one example, IDP 10 allows the system administrator to specify attack definitions. In some examples, the system administrator specifies compound attack definitions. Further details on application of attack definitions, e.g., compound attack definitions, may be found within U.S. patent application Ser. No. 11/045,572, Guruswamy et al., "Compound Attack Detection in a Computer Network," filed Jan. 27, 2005, which is hereby incorporated by reference in its entirety.

IDP 10 identifies packet flows in the monitored traffic, and transparently reassembles application-layer communications from the packet flows. A set of protocol-specific decoders within the IDP 10 analyzes the application-layer communications and identifies application-layer transactions. In general, a "transaction" refers to a bounded series of one or more related application-layer communications between peer devices. Transactions are generally identifiable as elements of a packet or other unit of network communication according to a particular protocol. Protocols typically define fields within the packet that include certain data. In this manner, IDP 10 identifies transactions by checking particular protocol fields of packets exchanged during the communication session. As an example, a TCP connection can be used to send (receive) multiple HyperText Transfer Protocol (HTTP) requests (responses). A single web-page comprising multiple images and links to HTML pages may be fetched using a single TCP connection. An HTTP decoder identifies each request/response within the TCP connection as a different transaction. This may be useful to prevent certain attack definitions from being applied across transaction boundaries. In one example, a communication session is identified according to source and destination IP address, protocol, and source and destination port numbers. Other examples identify communication sessions in other ways, for example, by using media access control (MAC) addresses.

IDP 10 applies the attack definitions to the elements and the protocol-specific anomalies identified by the protocol decoders to detect and prevent network attacks. For example, a system administrator may specify a compound network attack that includes the protocol anomaly of repeated FTP login failure and a pattern that matches a login username of "root." In this manner, the system administrator may combine pattern analysis with protocol anomalies to define complex attack definitions. In the event of a network attack, IDP 10 takes one or more programmed actions, such as automatically dropping packet flows associated with the application-layer communications within which the network attack was detected.

A bot, as the term is used in this disclosure, generally comprises a program that executes on one or more networked computing devices to perform a malicious network session. A bot may execute a script, such that the bot performs a series of one or more actions for the malicious network session. Bots typically act in concert with other bots, forming a "bot net." A bot net may include several thousand to a million or even more computing devices all acting in concert. In a typical bot net, a group of bots act in concert at the direction of a computing device at a central location, which may include a computing device of the malicious user who wrote the bot or a hacked or infected computer terminal. The centrally located computing device may inform the bots of the bot net as to the identity of a target, such as the network address of the target, and instruct the bots to attack the target. In this manner, bot nets may be used to execute distributed network flood attacks.

Malicious software agents utilize the network session to perform malicious acts, such as, for example, denial of service (DoS) attacks, click fraud, output of spam, or other malicious network activity. Bots may be programmed to identify a particular type of transaction for a server, such as one of nodes 8, that causes the server to utilize a relatively large amount of computational power. Once the bots discover such a type of transaction, such as a particular protocol field or a particular entry in a protocol field, the bots may issue a large number of requests for that type of transaction repeatedly, in an attempt to bring down the server. Moreover, a single bot may discover the expensive type of transaction, inform the central computer terminal, and the computer terminal may instruct all bots of a bot net to connect with the server and perform the expensive type of transactions.

Upon recognizing this type of bot and bot net activity, IDP 10, in accordance with the techniques of this disclosure, first monitors a number of connections, then monitors requests for individual types of transactions, and finally monitors which clients are performing a particular type of transaction in excess of a corresponding threshold. The threshold may correspond to behavior of a "normal" client. When IDP 10 determines that one or more of the clients performing that type of transaction are doing so in excess of the threshold, IDP 10 blocks the clients, determining that the clients are malicious. In this manner, IDP 10 is able to block malicious clients and keep the server active without preventing access to the expensive type of transactions by normal clients.

Figure 2:
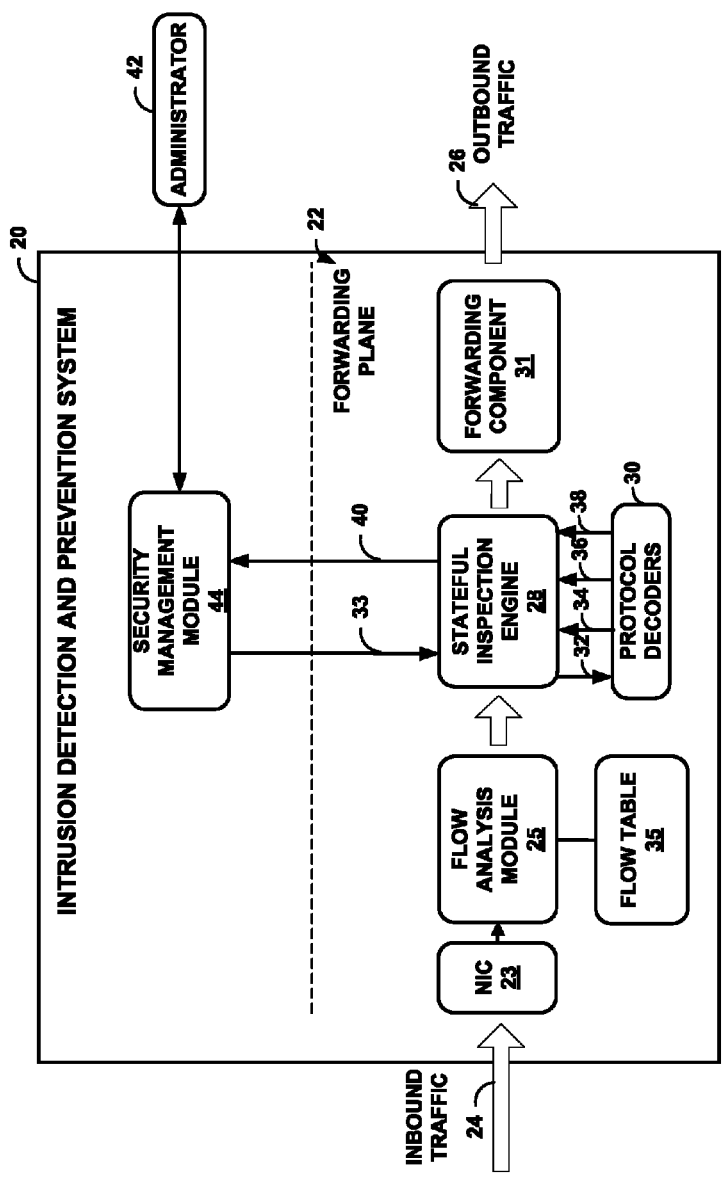
FIG. 2 is a block diagram illustrating an example arrangement of an IDP.

FIG. 2 is a block diagram illustrating an example arrangement of an IDP 20. In the illustrated example, IDP 20 includes a forwarding plane 22 that transparently monitors inbound network traffic 24 and forwards the network traffic as outbound network traffic 26. In the example illustrated by FIG. 2, forwarding plane 22 includes flow analysis module 25, stateful inspection engine 28, a plurality of protocol decoders 30, forwarding component 31 and security management module 44. The example of IDP 20 of FIG. 2 illustrates IDP 20 as a single network device, such as IDP 10 or 14 of FIG. 1. Other examples implement the functionality of IDP 20 in multiple network devices or in other types of devices, such as security management device 18, switch 19, or firewall 9 of FIG. 1. IDP 20 is also referred to as a security device or network security device, and devices protected by IDP 20 (e.g., nodes 8 of FIG. 1) are referred to as protected network devices or protected servers.

Security management module 44 presents a user interface by which administrator 42 configures IDP 20. For example, administrator 42 may configure IDP 20 to monitor particular subnets of the enterprise network. In addition, security management module 44 presents a user interface by which administrator 42 may specify attack definitions 33, which security management module 44 relays to stateful inspection engine 28. In some examples, administrator 42 specifies a connections threshold, a transaction-type threshold, and a client-transactions threshold via the user interface of security management module 44.

In some examples, security management module 44 allows administrator 42 to configure exceptions for certain transaction types and well-known protocol-field values. For example, administrator 42 may define an exception for http requests to "www.google.com," because it is likely that the number of connections to "www.google.com" will exceed the connections threshold normally, even when no malicious activity is occurring. Similarly, security management module 44 allows administrator 42 to exclude certain values for certain protocol fields when administrator 42 determines that these values are known not to be malicious, in order to avoid false positives.

In one example, attack definitions 33 comprise compound attack definitions. Compound attack definitions generally define attacks according to a plurality of elements at one or more protocol layers, in a manner that is outside the general scope of this disclosure. However, it should be understood that the techniques of this disclosure may be incorporated into a device that utilizes compound attack definitions in addition to the techniques of this disclosure to detect and handle network attacks. Moreover, security management module 44 may present a user interface by which administrator 42 may modify assumptions regarding packet flow characteristics, such as the highest priority packet flows for monitoring, port bindings for applications, or other features of determining a type of application and protocol associated with the packet flow. In one example, security management device 18 (FIG. 1) implements the functionality of security management module 44 to enable administrator 42 to program IDP 20 remotely. Security management device 18 may configure IDP 20 via, for example, the simple network management protocol (SNMP) in accordance with a configuration received from administrator 42.

Flow analysis module 25 receives inbound traffic 24 and identifies network flows within the traffic. Flow analysis module 25 includes or is coupled to network interface card (NIC) 23. Each network flow represents a flow of packets in one direction within the network traffic and is identified by at least a source address, a destination address and a communication protocol. Flow analysis module 25 may utilize additional information to specify network flows, including source media access control (MAC) address, destination MAC address, Layer 4 source port, and Layer 4 destination port. Other examples may use other information to identify network flows, such as IP addresses.

Flow analysis module 25 maintains data within flow table 35 that describes each active packet flow present within the network traffic. Flow table 35 specifies network elements associated with each active packet flow, i.e., low-level information such as source and destination devices and ports associated with the packet flow. In addition, flow table 35 identifies pairs or groups of packet flows that collectively form a single communication session between a client and server. For example, flow table 35 may designate communication sessions as pairs of packet flows in opposite directions for flows sharing at least some common network addresses, ports, and protocol.

As described in further detail below, stateful inspection engine 28 inspects packet flows to identify attacks within the packet flows. In accordance with the techniques of this disclosure, stateful inspection engine 28 inspects the packet flows using a three-stage analysis to detect network flood attacks by bots operating at the application layer. When stateful inspection engine 28 detects a flood attack, stateful inspection engine 28 executes a programmed response, such as sending alert 40 to security management module 44 or instructing forwarding component 31 to drop packets of the packet flow or to end the network session corresponding to the packet flow. Stateful inspection engine 28 may also rate-limit the packet flow, i.e., throttle network sessions corresponding to detected bots to a certain bit-rate, such as 10 Mbits/second.

Attack detection module 52 may also record an identifier of at least one of the network devices participating in the flood attack in flow table 35 and block future connection requests originating from the network device having the recorded identifier. That is, flow analysis module 25 may receive a connection request, determine that the connection request originates from the identifier recorded in flow table 35, and block the connection request. In this manner, IDP 20 may block future connection requests from the network device participating in the network session as the programmed response. Forwarding component 31 may also construct a message to send to other network devices, such as other routers or IDP, IPS, or firewall (FW) devices, to block or otherwise respond to packet flows from the source network device for which stateful inspection engine 28 detected a bot. Alert 40 may include details such as a source address of the packet flow, an identification of the application corresponding to the packet flow, or other information regarding the network session.

In one example, stateful inspection engine 28 includes a co-processor (not shown) to perform application identification. The co-processor may continually receive input in the form of the packet flow and may constantly perform application identification on the packet flow. For each chunk of the packet flow, the co-processor may return the identity or identities for the application(s) that the co-processor identified.

In general, protocol decoders 30 include a set of one or more protocol-specific software modules that process application-layer communications 32 and output transaction data 34 that identifies application-layer transactions. In particular, transaction data 34 indicate when a series of related application-layer communications between two peer devices start and end. In one example, one or more of protocol decoders 30 may be generic protocol decoders, such that the generic protocol decoders attempt to identify the application corresponding to the payload of an application-layer communication 32. An example of a generic protocol decoder is an algorithm that matches a predefined set of application fingerprints/signatures to the data being decoded and identifies the application based on a particular fingerprint match. For example, a generic protocol decoder may attempt to identify the application corresponding to the payload of an HTTP communication.

Many of protocol decoders 30 correspond to a different communication protocol or service. Examples of communication protocols that may be supported by protocol decoders 30 include the HyperText Transfer Protocol (HTTP), the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Server Message Block (SMB) and other protocols. In one example, each of protocol decoders 30 receives data via a universal software interface, i.e., a software interface that processes application data in a manner that is independent from the underlying transport mechanism. In this way, protocol decoders may be swapped, reused and stacked (layered) when applied to a given packet flow.

After application of protocol decoders 30 to a given packet flow or individual packet, the protocol decoders return transaction data 34, application-layer elements 36, and protocol anomaly data 38 to stateful inspection engine 28. In some examples, stateful inspection engine 28 applies compound attack definitions of attack definitions 33 to protocol-specific application-layer elements 36 and anomaly data 38 to detect and prevent network attacks and other security risks, in addition to or in the alternative to the techniques of this disclosure.

In the event a security risk is detected, stateful inspection engine 28 may output alert 40 to security management module 44 for logging and further analysis. In addition, stateful inspection engine 28 may take additional actions according to a policy definition, such as dropping the packets associated with the communication session, automatically closing the communication session or other action. If no security risk is detected for a given communication session, forwarding component 31 continues to forward the packet flows between the peers. Forwarding component 31 may, for example, maintain a routing table that stores routes in accordance with a topology of the enterprise network for use in forwarding the packet flows.

Figure 3:
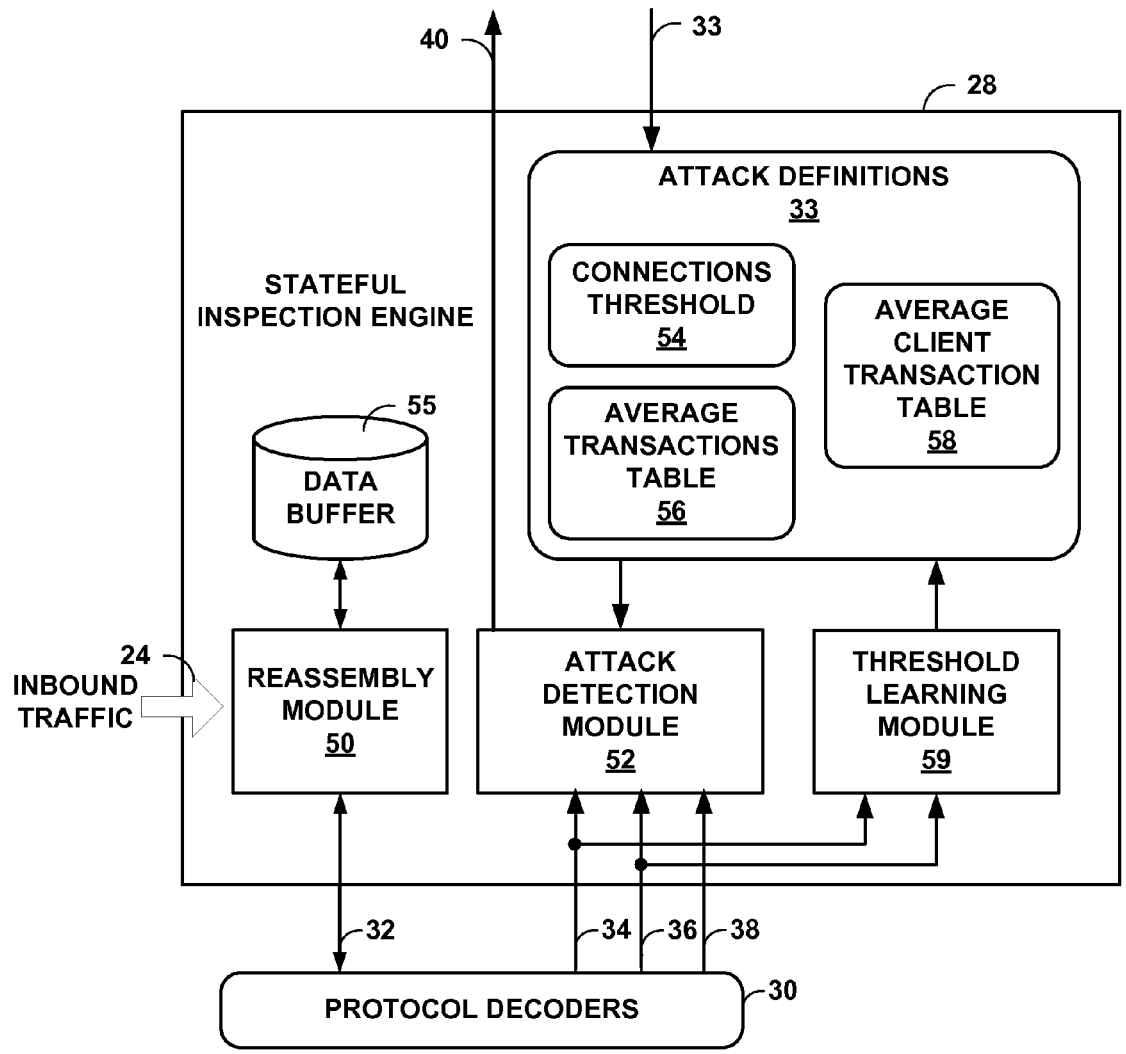
FIG. 3 is a block diagram illustrating an example of a stateful inspection engine of the IDP shown in FIG. 2.

FIG. 3 is a block diagram illustrating an example of stateful inspection engine 28 of IDP 20 in further detail. In the example, stateful inspection engine 28 includes reassembly module 50, attack detection module 52, data buffer 55, attack definitions 33, and threshold learning module 59. Reassembly module 50 receives inbound network traffic 24 and reassembles application-layer communications 32 from the packet flows by removing any underlying transport information (e.g., layer four (L4) information and below). Reassembly module 50 forwards the reassembled application-layer communications 32 to the appropriate protocol decoders 30 for processing.

Stateful inspection engine 28 stores attack definitions 33 received from security management module 44. Attack definitions 33 may be stored, for example, in a computer-readable medium, such as random access memory (RAM). In the example of FIG. 3, attack definitions 33 include connections threshold 54, average transactions table 56, and average client transactions table 58. Connections threshold 54 defines one or more of a concurrent number of active connections and/or a rate at which connection requests are received for a server. Average transactions table 56 defines thresholds for each type of transaction, and average client transactions table 58 defines thresholds for clients with respect to each type of transaction. In this manner, average transactions table 56 defines a transaction-type threshold and average client transaction table 58 defines a client-transaction threshold. Attack definitions 33 generally define an attack as a situation in which one or more clients exceed the client-transaction threshold for a particular type of transaction when the rate at which transactions for that type of transaction exceeds a transaction-type threshold and when connections exceed a connections threshold. Attack definitions 33 may also comprise compound attack definitions that define other types of attacks in addition to the definition of an attack for the purposes of this disclosure. In this manner, the techniques of this disclosure may be incorporated into an existing IDP or other device for detecting and/or preventing network attacks.

When stateful inspection engine 28 receives a packet as part of a packet flow, reassembly module 50 buffers the packet in data buffer 55. In one example, data buffer 55 stores data as a sliding window. That is, data buffer 55 stores data until becoming full or reaching a specified required amount of minimum data for identification. When full, data buffer 55 discards certain data to make room for storing new data. In one example, data buffer 55 stores and discards data according to a first-in, first-out (FIFO) protocol wherein the first data to be stored is the first data to be discarded when data buffer 55 becomes full. In another example, data buffer 55 discards data according to a least recently used protocol wherein, when data buffer 55 is full, the packet flow which has been least recently used will be discarded to make room for new data to be stored.

In one example, reassembly module 50 associates packets in a packet flow of a network session according to the 5-tuple {source IP address, destination IP address, protocol, source port, destination port}. Other examples use other methods to associate packets with a particular packet flow or encapsulated packet flow. In one example, IDP 20 comprises part of a network that utilizes virtual local area networks (VLANs). Accordingly, reassembly module 50 may associate packets in a packet flow according to a VLAN identifier, a source address, and a destination address.

Attack detection module 52 applies attack definitions 33 to application-layer elements 36 and protocol anomaly data 38 received from protocol decoders 30. In addition to determining whether the defined attack patterns are present, attack detection module 52 may determine whether any protocol anomalies detected by protocol decoders 30 match the protocol anomalies specified by attack definitions 33. Attack detection module 52 determines that the corresponding packet flow matches one of attack definitions 33 when both the patterns and protocol anomalies specified by the attack definition are detected within a given communication session. Further, each of attack definitions 33 may specify whether the pattern matching and protocol anomalies must be satisfied on a per-transaction basis or over the lifetime of the communication session. That is, each of attack definitions 33 may specify whether a particular pattern or protocol anomaly may be satisfied within a single protocol field or over the entire stream of data for a session.

In accordance with the techniques of this disclosure, attack detection module 52 also performs a three-stage analysis of network traffic, namely, analysis of application-layer elements 36 and transaction data 34 aspects of network traffic. During the first stage, also referred to as the service monitoring stage, attack detection module 52 generally monitors connections to one of nodes 8 (FIG. 1). This may include monitoring a number of active connections and/or a rate at which connection requests are received, that is, a number of connection requests received over a defined period of time. In this manner, attack detection module 52 generally monitors the load on one or more servers that are protected by IDP 20 during the first stage.

To determine a number of active connections, attack detection module 52 retrieves data from flow table 35 (FIG. 2) to determine how many connections are active to a particular server, e.g., one of computing nodes 8. Attack detection module 52, in some examples, also analyzes application-layer elements 36 and transaction data 34 to determine a rate at which connection requests are received. In these examples, attack detection module 52 calculates a number of connection requests received over a given time interval, also referred to as a "time tick."

In some examples, attack detection module 52 determines both a number of current connections and a rate at which connection requests are received. Attack detection module 52 progresses to the second stage of analysis when either or both of the current connections and/or the rate at which connection requests are received exceed connections threshold 54. In some examples, attack definitions 33 defines two connections thresholds: a first connections threshold corresponding to a number of current connections and a second connections threshold corresponding to a rate at which connection requests are received.

In one example, to determine a number of current connections to a protected server, attack detection module 52 queries flow table 35 to determine the number of entries in flow table 35. The number of entries of flow table 35 generally corresponds to the number of currently active connections or communication sessions. To determine a rate of connection requests, attack detection module 52 analyzes transaction data 34 to determine whether a network communication represents a request to initiate a network session. In one example, the request to initiate a network session comprises a TCP/IP synchronization (SYN) packet. Accordingly, attack detection module 52 determines whether a SYN flag of a received packet in the TCP header of the packet is set. Thus attack detection module 52 may determine to begin the second stage of analysis when attack detection module 52 receives a number of SYN packets over a period of time in excess of connections threshold 54. Although described primarily with respect to TCP for purposes of example, it should be understood that the techniques of this disclosure are generally applicable to any Internet protocols. For example, the techniques are also applicable to User Datagram Protocol (UDP) or other stateless protocols, in addition to TCP.

To determine the number of SYN packets received over a period of time, in one example, attack detection module 52 maintains a data structure (not shown), such as a queue, array, or linked-list, having a length corresponding to a number of SYN packets received over a period of time. Attack detection module 52 assigns to each element of the data structure a time stamp corresponding to the time at which the SYN packet corresponding to the element was received. When the difference between a current time and the period of time results in a time that is greater than the time stamp of the oldest element, attack detection module 52 removes the oldest element from the data structure. In this manner, when the length of the data structure exceeds connections threshold 54, attack detection module 52 begins the second stage of analysis. Thus, upon determining that the connections exceed connection threshold 54, attack detection module 52 performs a second stage of analysis.

During the second stage of analysis, also referred to as the protocol profiling stage, attack detection module 52 generally monitors a plurality of types of transactions for the active connections. Specifically, at the second stage of analysis, attack detection module 52 may perform content inspection and decode application layer protocols using protocol decoders 30. For example, the types of transactions are identified within a packet at one or more particular locations according to a protocol for the corresponding communication session. Protocol decoders 30 are configured to identify the types of transactions being requested according to the corresponding protocol. Attack detection module 52 may maintain traffic statistics about the protocol transactions, and detect anomalous events based on analysis of the data. For example, attack detection module 52 monitors the number and/or rate of types of transactions based on data provided by protocol decoders 30, such as transaction data 34 and application-layer elements 36. Accordingly, attack detection module 52 monitors one or more protocol fields during the second stage to identify a number and/or rate for types of transactions.

In one example, types of transactions are associated with particular uniform resource indicators (URIs) of a server. For example, a server accessible via "example.com" may include transaction types associated with "example.com/home," "example.com/get_shipping_cost," "example.com/place_order," "example.com/display_catalog," "example.com/search_for_item," "example.com/view_cart," and "example.com/order_status." This corresponds to an example for domain name system (DNS), and the types of transactions for DNS are generally referred to as "DNS requests" transactions. Other examples can utilize other transaction types not associated with URIs. As one example, attack detection module 52 may monitor SMTP-verify requests to detect an e-mail server flood attack.

In one example, attack detection module 52 maintains a table that tracks the number of requests for each type of transaction, such as a protocol field entry. Attack detection module 52 compares values for each of the types of transactions to average transactions table 56 that sets transaction-type thresholds for each of the types of transactions, also referred to as a "Top-N table" in this disclosure. Average transactions table 56 generally indicates threshold values for each type of transaction listed in average transactions table 56. This allows attack detection module 52 to compare monitored values for each type of transaction to corresponding thresholds defined in average transactions table 56. Average transactions table 56 includes thresholds configured for an expected number and/or rate of types of transactions. For example, attack detection module 52 may monitor values for a particular protocol field as the type of transaction. When attack detection module 52 determines that a value for the monitored protocol field exceeds the associated threshold, attack detection module 52 transitions to the third stage of analysis. In some examples, average transactions table 56 is preconfigured with threshold values for each type of transaction, e.g., each protocol field or entry types for each protocol field, while in other examples, threshold learning module 59 creates average transactions table 56, as described in greater detail below.

In some examples, the attack may target random transactions. In these cases, the attack detection module 52 is configured to compare a total number of transactions to a threshold aggregate transaction value in average transactions table 56. In such examples, attack detection module 52 also transitions to the third stage of analysis when a total number of aggregate transactions determined during the second stage exceeds the threshold aggregate transaction value of average transactions table 56.

During the third stage of analysis, attack detection module 52 generally monitors originating network addresses for transactions of the one of the types of transactions that triggered attack detection module 52 to enter the third stage. That is, for a plurality of types of transactions monitored by attack detection module 52, attack detection module 52 determines that at least one of the types of transactions exceeds a threshold defined by the Average Transactions table and enters the third stage, then monitors clients that are performing the type of transaction that exceeded the corresponding threshold of average transactions table 56. The type of transaction that exceeded the corresponding threshold may be referred to as an "offending" transaction. The third stage is also referred to as the client profiling stage, because attack detection module 52 monitors the usage of offending transactions identified in the second stage on a per client IP address basis.

Average client transaction table 58 generally defines thresholds for normal client behavior for each type of transaction. Average client transaction table 58 includes entries for each type of transaction. Each of the entries defines a number and/or rate on a per-client basis, rather than on a per-transaction-type or per-protocol-field basis (as with average transactions table 56). For each client performing transactions of the type that exceeded the threshold in stage two, attack detection module 52 determines a number of and/or rate at which the client is performing the offending type of transaction. That is, each time the offending type of transaction is requested, attack detection module 52 identifies the IP address of the client performing the transaction and increments a corresponding counter for that client. To do so, attack detection module 52 identifies the client's IP address in transaction data 36 from protocol decoders 30. Attack detection module 52 builds a client transaction table (not shown) that includes counters corresponding to each of the clients that are performing the offending transaction.

Attack detection module 52 monitors entries in the client transaction table to determine whether any client has requested the offending transaction a number of times in excess of the threshold defined in average client transaction table 58. Attack detection module 52 labels each client having a number of requests that exceeds the corresponding threshold as a malicious client, and causes IDP 20 to execute a programmed response with respect to such malicious clients. In some examples, the programmed response includes one or more of blocking network connections of the malicious clients, dropping packets of network connections associated with the malicious clients, blocking connection attempts originating from the malicious clients, advertising IP addresses of the malicious clients to another network device to cause the other network device to block network connections of the malicious clients, sending a close-session message to the malicious clients, rate limiting future sessions from the client, and sending a close-session message to a server in communication with the malicious clients. To send messages to the malicious clients, such as close session messages, attack detection module 52 directs forwarding component 31 to assemble and forward the messages. The close session messages, in some examples, comprise TCP/IP close session messages.

In some examples, when a security risk is detected (such as a client exceeding a corresponding threshold for an offending type of transaction), stateful inspection engine 28 outputs alert 40 to security management module 44 (FIG. 2) for logging and further analysis. Stateful inspection engine 28 may also direct forwarding component 31 to execute a programmed response to the security risk. As discussed above, the programmed response may include automatically dropping packets of the packet flow associated with the application-layer communications within which the network attack was detected. As a result of the packets being dropped, the packets will not reach their intended destination. This prevents the malicious client from carrying out its intended attack on the destination, e.g., consuming an excess of the destination's resources. Stateful inspection engine 28 may also cause forwarding component 31 to send a close session message to one or more participants in the malicious network session as the programmed response.

With respect to the above example of "example.com," assume that attack detection module 52 determines that during the second stage, a transaction "example.com/get_shipping_cost" exceeded a corresponding threshold in average transactions table 56. That is, "example.com/get_shipping_cost" is the offending type of transaction. Accordingly, during the third stage, attack detection module 52 would determine a number of times each client performed "example.com/get_shipping_cost" and compare these values to the threshold defined in average client transaction table 58. When an individual client performs "example.com/get_shipping_cost" in excess of the threshold defined by average client transaction table 58, attack detection module 52 labels that client as malicious and causes IDP 20 to perform a programmed response with respect to that client.

In this manner, attack detection module 52 is able to label only those clients performing a particular type of transaction in excess of a corresponding client-transaction threshold as malicious and blocked, without preventing access to the service (that is, the type of transaction) to non-malicious entities that have not exceeded the client-transaction threshold.

In the example of FIG. 3, IDP 20 includes threshold learning module 59. Threshold learning module 59 dynamically creates connections threshold 54, average transactions table 56, and average client transaction table 58 during a learning stage for IDP 20. When IDP 20 enters the learning stage, threshold learning module 59 receives transaction data 34 and application-layer data 36 from protocol decoders 30. Threshold learning module 59 also retrieves data from flow table 35 (FIG. 2) during the learning stage. Threshold learning module 59 monitors this data during the learning stage to define thresholds for attack definitions 33, e.g., based on learned averages, such that attack detection module 52 is able to determine whether data monitored later exceeds the thresholds determined during the learning stage. In some examples, threshold learning module 59 performs distinct learning stages for different times of day and/or different times of the week, to account for natural variations on different days and at different times of day.

In some examples, threshold learning module 59 defines the average number of connections during the learning stage, determined from flow table 35, as connections threshold 54. Threshold learning module 59 also creates average transactions table 56 and average client transaction table 58 during the learning stage. Threshold learning module 59 identifies, for a particular protocol decoded by protocol decoders 30, each type of transaction, an average number of requests and/or rate of requests for each type of transaction (recorded in average transactions table 56), and an average number of times and/or rate at which each individual client performs each type of transaction (recorded in average client transaction table 58).

In some examples, rather than defining the thresholds as the calculated averages, threshold learning module 59 sets the thresholds according to a statistically significant modification, such as a number of standard deviations away from the calculated average. In one example, threshold learning module 59 sets the connection threshold at two standard deviations from the determined average number of connections, the transaction-type threshold for a particular type of transactions at two standard deviations from the determined average number of requests for the type of transactions, and the client-transaction threshold at two standard deviations from the determined average number of client requests for the type of transaction. In another example, threshold learning module 59 sets the connection threshold at a certain percentage value above the learned average thresholds, e.g., fifteen percent above the learned average thresholds. An administrator may configure or otherwise vary the percentage value.

Although described as separate modules, in some examples, attack detection module 52 and threshold learning module 59 are incorporated into a single module. In some examples, attack detection module 52 performs the functionality described with respect to threshold learning module 59. Moreover, attack detection module 52 and/or threshold learning module 59 may be implemented in any combination of software, firmware, and/or hardware. In some examples, dedicated hardware units, such as ASICs or FPGAs, implement the functionality of either or both of attack detection module 52 and/or threshold learning module 59. Therefore, the term "module" as used herein may encompass both executable instructions encoded in a computer-readable medium and a dedicated hardware unit.

Figure 4:
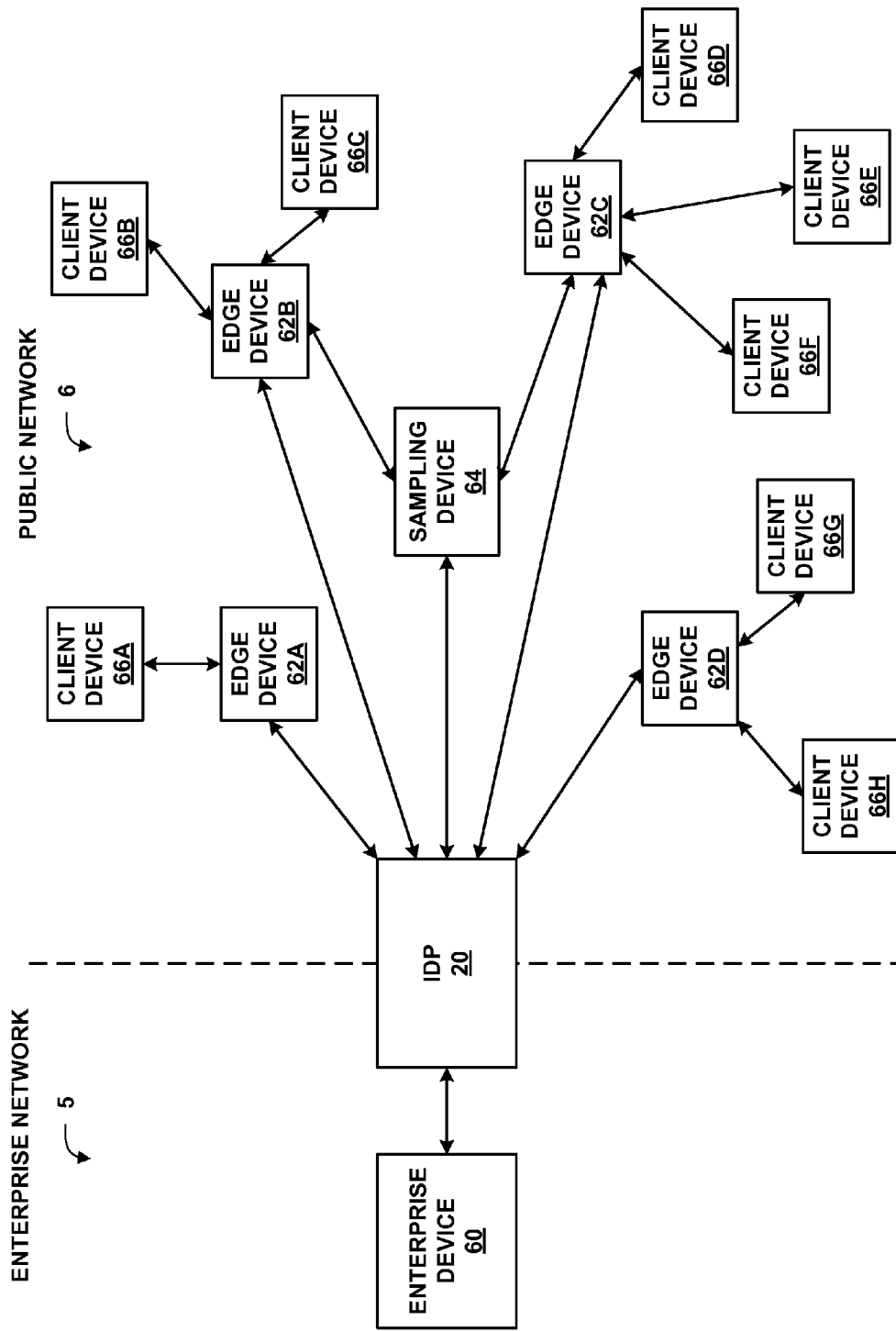
FIG. 4 is a block diagram illustrating an example arrangement of network devices in which an IDP monitors traffic from a plurality of client devices to prevent network attacks.

FIG. 4 is a block diagram illustrating a system having an example arrangement of network devices in which IDP 20 monitors traffic from a plurality of client devices 66A-66H (client devices 66) to prevent network attacks upon an enterprise device 60. In the example of FIG. 4, IDP 20 protects enterprise device 60, which may correspond to any of nodes 8 (FIG. 1). Client devices 66 communicate with enterprise device 60 via a corresponding one of edge devices 62A-62D (edge devices 62). For example, network communications from client device 66A to enterprise device 60 are forwarded by edge device 62A. Edge devices 62 may comprise, for example, routers, switches, gateways, or other intermediate network devices.

In the example of FIG. 4, edge devices 62 also collect data for IDP 20 to assist IDP 20 in performing the three-stage analysis described in this disclosure. Edge devices 62 may also collect data used by IDP 20 in performing the learning stage. In general, edge devices 62 determine a number of connections and/or rate of connection requests from corresponding client devices 66 to enterprise device 60, a number of requests for each type of transaction in the aggregate and by client devices 66 to which the one of edge devices 62 is coupled. Edge devices 62 forward this data to IDP 20, and IDP 20 aggregates the data from each of edge devices 62 to determine whether to block a particular one of client devices 66, e.g., when one of client devices 66 exceeds a threshold in requesting an offending type of transaction.

In the example of FIG. 4, edge devices 62B and 62C are coupled to sampling device 64. Sampling device 64 may additionally or alternatively be configured to collect the data for IDP 20 to assist in the three-stage analysis performed by IDP 20. In this manner, IDP 20 may block malicious network devices according to remote monitoring of a plurality of network devices including the malicious network devices.

Although four edge devices 62 and eight client devices 66 are shown in FIG. 4, public network 6 may include any number of edge devices 62 and client devices 66, and in any arrangement. Also, in some examples, IDP 20 is communicatively coupled to edge devices 62 through one or more intermediate devices, such as routers, switches, gateways, or hubs.

Figure 5:
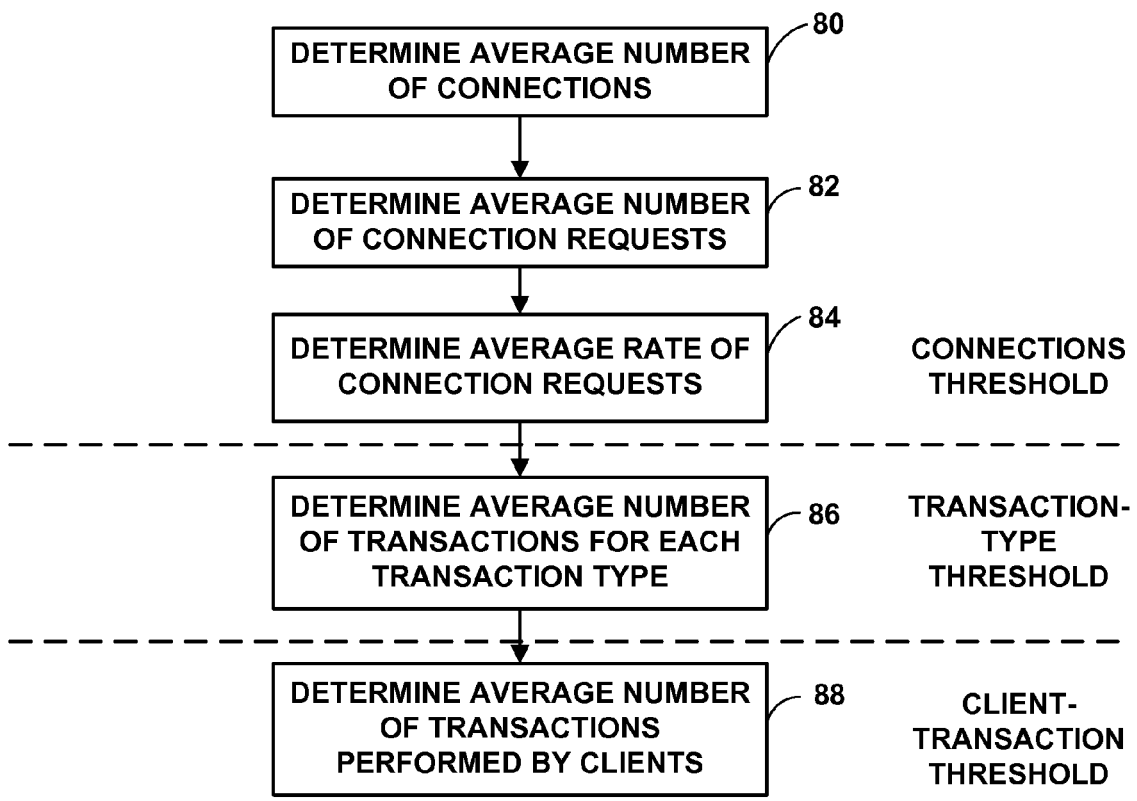
FIG. 5 is a flowchart illustrating an example method for performing a learning stage to dynamically determine a connection threshold, a transaction-type threshold, and a client-transaction threshold.

FIG. 5 is a flowchart illustrating an example method for performing a learning stage to dynamically determine a connection threshold, a transaction-type threshold, and a client-transaction threshold. Although the method of FIG. 5 is generally described with respect to threshold learning module 59 (FIG. 3), other modules and/or devices can be configured to perform the method of FIG. 5. Although shown in FIG. 5 as a sequence of steps, each of the steps of FIG. 5 may also be performed in parallel. In one example, attack detection module 52 (FIG. 3) performs the method of FIG. 5. In general, threshold learning module 59 performs the method of FIG. 5 during a learning stage to determine connections threshold 54, average transactions table 56, and average client transactions table 58.

During the learning stage, threshold learning module 59 receives connections data from flow table 35 (FIG. 2) and transaction data 34 and application-layer elements 36 from protocol decoders 30 (FIG. 3). From the connections data, threshold learning module 59, in the example of FIG. 5, determines an average number of connections (80), an average number of connection requests (82), and an average rate at which the connection requests are received (84). As one example, threshold learning module 59 identifies connection requests from TCP SYN packets for which a SYN flag is set in the TCP header and that target one of nodes 8 (FIG. 1). Threshold learning module 59 determines the average number of connections as the average number of ongoing connections during the learning stage.

In one example, threshold learning module 59 divides the learning stage into a plurality of time intervals, also referred to as "time ticks." Threshold learning module 59 determines a number of active connections for each of the time intervals, and calculates the average number of connections during the time intervals. Threshold learning module 59 may set the calculated average number of connections as connections threshold 54. In one example, each time tick comprises thirty seconds. In one example, threshold learning module 59 determines a number of connection requests received during each of the time intervals and calculates the average number of connection requests during the time intervals as an average rate of connection requests for connections threshold 54. In one example, connections threshold 54 comprises a table that stores both the average number of active transactions and the average rate of connection requests.

Threshold learning module 59 also determines an average number of transactions for each type of transaction (86). Threshold learning module 59 constructs average transactions table 56 as a table that identifies each type of transaction and a number of times each type of transaction is requested during the learning stage. In some examples, threshold learning module 59 determines the number of times each type of transaction is performed during each of the time intervals and calculates the average for each type of transaction from the numbers for the time intervals. In some examples, threshold learning module 59 constructs average transactions table 56 as a table similar to Table 1 below:

TABLE 1

| Type of Transaction | Number of Requests |
|---|---|
| example.com/home | 1,000 |
| example.com/get_shipping_cost | 250 |
| example.com/place_order | 100 |
| example.com/display_catalog | 800 |
| example.com/search_for_item | 700 |
| example.com/view_cart | 175 |
| example.com/order_status | 80 |

Threshold learning module 59 also determines an average number of times each type of transaction, e.g., each type of entry for a particular protocol field, is performed or requested by individual clients (86). That is, for each type of transaction, threshold learning module 59 determines (i) that an instance of the type of transaction is performed and (ii) an identifier (e.g., IP address) of a client device that performed the instance of the type of transaction. Threshold learning module 59 stores this data as average client transactions table 58. In some examples, threshold learning module 59 constructs average client transactions table 58 as a table similar to Table 2 below:

TABLE 2

| Type of Transaction | Average Number of Requests Per Client |
|---|---|
| example.com/home | 3 |
| example.com/get_shipping_cost | 2 |
| example.com/place_order | 1 |
| example.com/display_catalog | 8 |
| example.com/search_for_item | 10 |
| example.com/view_cart | 4 |
| example.com/order_status | 2 |

Figure 6:
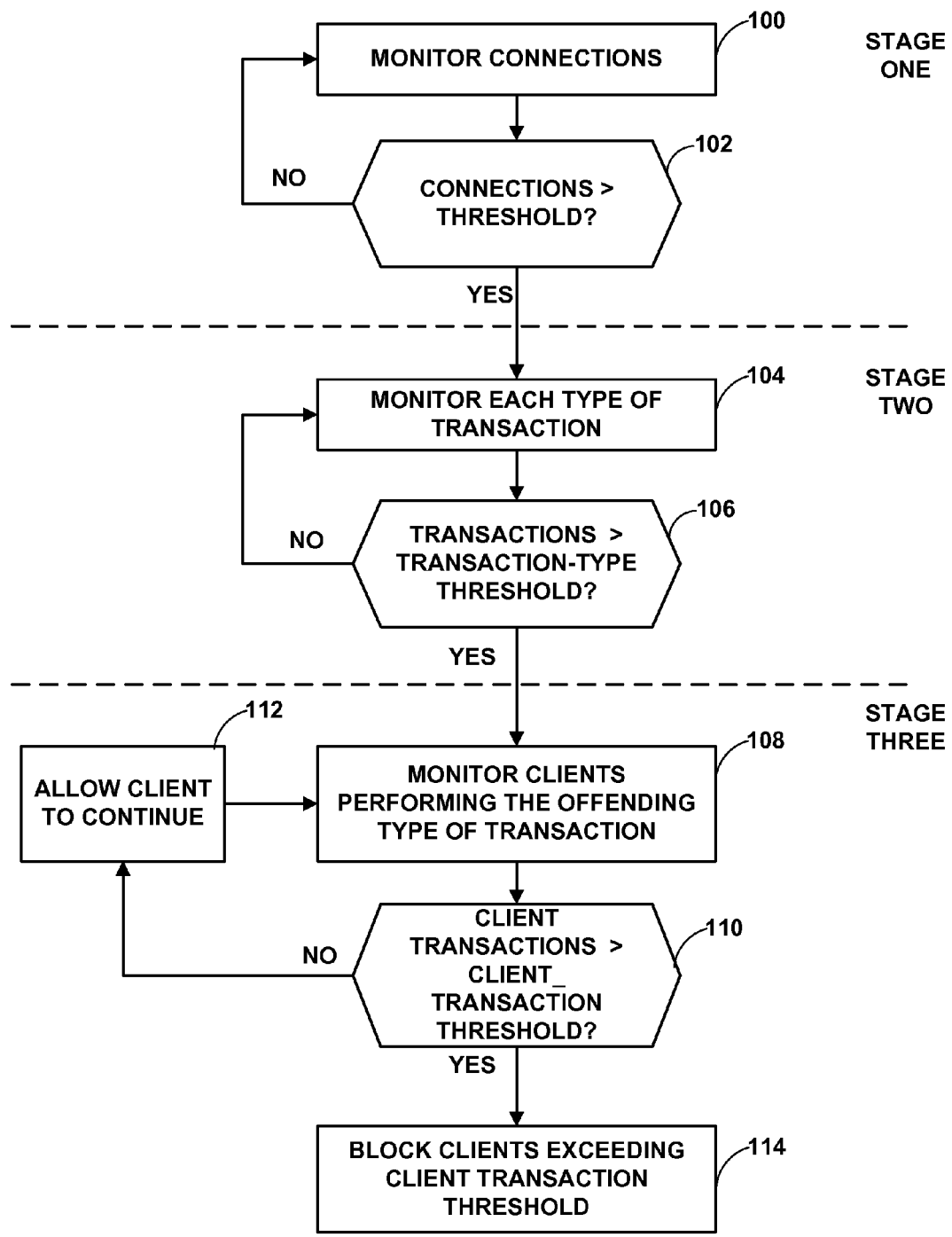
FIG. 6 is a flowchart illustrating an example method for preventing network flood attacks.

FIG. 6 is a flowchart illustrating an example method for preventing network flood attacks. In general, the method of FIG. 6 includes monitoring connections to a protected network device, and, upon determining that the connections exceed a connection threshold, monitoring a plurality of types of transactions for each of the connections. The method also includes, upon determining that at least one of the plurality of types of transactions exceeds a corresponding transaction-type threshold, monitoring network addresses from which transactions of the at least one of the plurality of types of transactions originate, and executing a programmed response with respect to at least one of the network addresses when the transactions of the at least one of the plurality of types of transactions originating from the at least one network address exceeds a corresponding client-transaction threshold. Although described with respect to IDP 20 (FIGS. 2 & 3), other devices are also able to perform the method of FIG. 6.

Initially, IDP 20 begins in stage one and monitors connections to each of nodes 8 (100), which are network devices protected by IDP 20. Attack detection module 52 compares active connections and/or connection requests for each of nodes 8 to connections threshold 54 (102) to determine whether the number of connections and/or rate at which connection requests are received for a particular one of nodes 8, such as node 8A, exceed limits defined by connections threshold 54. While the number of connections and rate at which connection requests are received remains below the threshold ("NO" branch of 102), attack detection module 52 continues to monitor the connections and remains in stage one of the analysis. However, when either or both of the number of connections and/or the rate at which connection requests are received exceeds connections threshold 54 ("YES" branch of 102) for one of nodes 8, such as node 8A, attack detection module 52 transitions to stage two of the analysis. In general, attack detection module 52 transitions to stage two with respect to each of nodes 8 for which attack detection module 52 determines connections exceed connections threshold 54. That is, IDP 20 in some examples maintains different stages of analysis for each of nodes 8. Accordingly, attack definitions 33 may define different thresholds for each of nodes 8. For example, different nodes 8 may have different associated thresholds based on characteristics of the nodes 8.

During stage two, attack detection module 52 monitors each type of transaction for which the number of connections exceeded connections threshold 54 (104), i.e., node 8A in this example. In some examples, attack detection module 52 also starts a timer for stage two, such that if the timer expires without progressing to stage three, attack detection module 52 transitions back down to stage one of the analysis. Attack detection module 52 calculates a number for each type of transaction corresponding to a number of transactions performed for each type of transaction. In some examples, attack detection module 52 additionally or alternatively determines a rate at which each type of transaction is requested. Attack detection module 52 compares the values for each type of transaction to corresponding transaction-type thresholds defined by average transactions table 56 (106). In some examples, attack detection module 52 transitions back down to stage one when the number of connections and/or the rate at which connection requests are received no longer exceeds connections threshold 54, in addition to or in the alternative to the timer example described above. That is, in some examples, attack detection module 52 does not use a timer but instead transitions back to stage one when the number of connections and/or the rate at which connection requests are received no longer exceeds connections threshold 54. In still other examples, attack detection module 52 transitions back to stage one either when the stage two timer expires or when the number of connections and/or the rate at which connection requests are received no longer exceeds connections threshold 54. In such examples, attack detection module 52 uses hysteresis to avoid thrashing between stage one and stage two.

While each type of transaction remains below the corresponding transaction-type threshold ("NO" branch of 106), attack detection module 52 remains in stage two of the analysis, and may eventually transition back down to stage one if the timer expires and if the number of connections and/or rate at which connection requests are received for a particular one of nodes 8 no longer exceed the limits defined by connections threshold 54. However, when attack detection module 52 determines that at least one of the types of transactions exceeds the corresponding transaction-type threshold ("YES" branch of 106), attack detection module 52 transitions to stage three of the analysis with respect to that type of transaction. Each of the types of transactions exceeding the corresponding threshold is referred to as an offending type of transaction. Furthermore, for a given node, attack detection module therefore may operate in stage three with respect to a first subset of the transaction types, while continuing to operate in stage two or stage one with respect to other subsets of the transaction types.

During stage three, attack detection module 52 monitors clients that are performing an offending type of transaction (108). That is, attack detection module 52 identifies IP addresses of each client performing an offending type of transaction and records how many times each of the clients performs each offending type of transaction. Attack detection module 52 compares the numbers for each client to corresponding thresholds of average client transaction table 58 (110). When a particular client exceeds the client-transaction threshold for an offending type of transaction ("YES" branch of 110"), IDP 20 blocks the client (114) or otherwise performs a programmed response with respect to the client. When a client has not exceeded the client-transaction threshold for the offending type of transaction ("NO" branch of 110"), IDP 20 allows the client's communications to proceed (112). In this manner, attack detection module 52 is able to label only those clients performing a particular type of transaction in excess of a corresponding client-transaction threshold as malicious and blocked, without preventing access to the service (that is, the type of transaction) to non-malicious entities that have not exceeded the client-transaction threshold. In some examples, attack detection module 52 sets a timer for stage three and transitions back down to stage two when the timer for stage three expires and/or when each of the types of transactions no longer exceed the corresponding transaction-type threshold. Attack detection module 52, in some examples, resets the timer when a client device is blocked. In some examples, attack detection module 52 transitions back down to stage two when each of the types of transactions no longer exceeds the corresponding transaction-type threshold, in addition to or in the alternative to the timer example described above. That is, in some examples, attack detection module 52 does not use a timer but instead transitions back to stage two when each of the types of transactions no longer exceeds the corresponding transaction-type threshold. In still other examples, attack detection module 52 transitions back to stage two either when the stage three timer expires and when the number of connections and/or when each of the types of transactions no longer exceeds the corresponding transaction-type threshold. In such examples, attack detection module 52 uses hysteresis to avoid thrashing between stage two and stage three.

Figure 7:
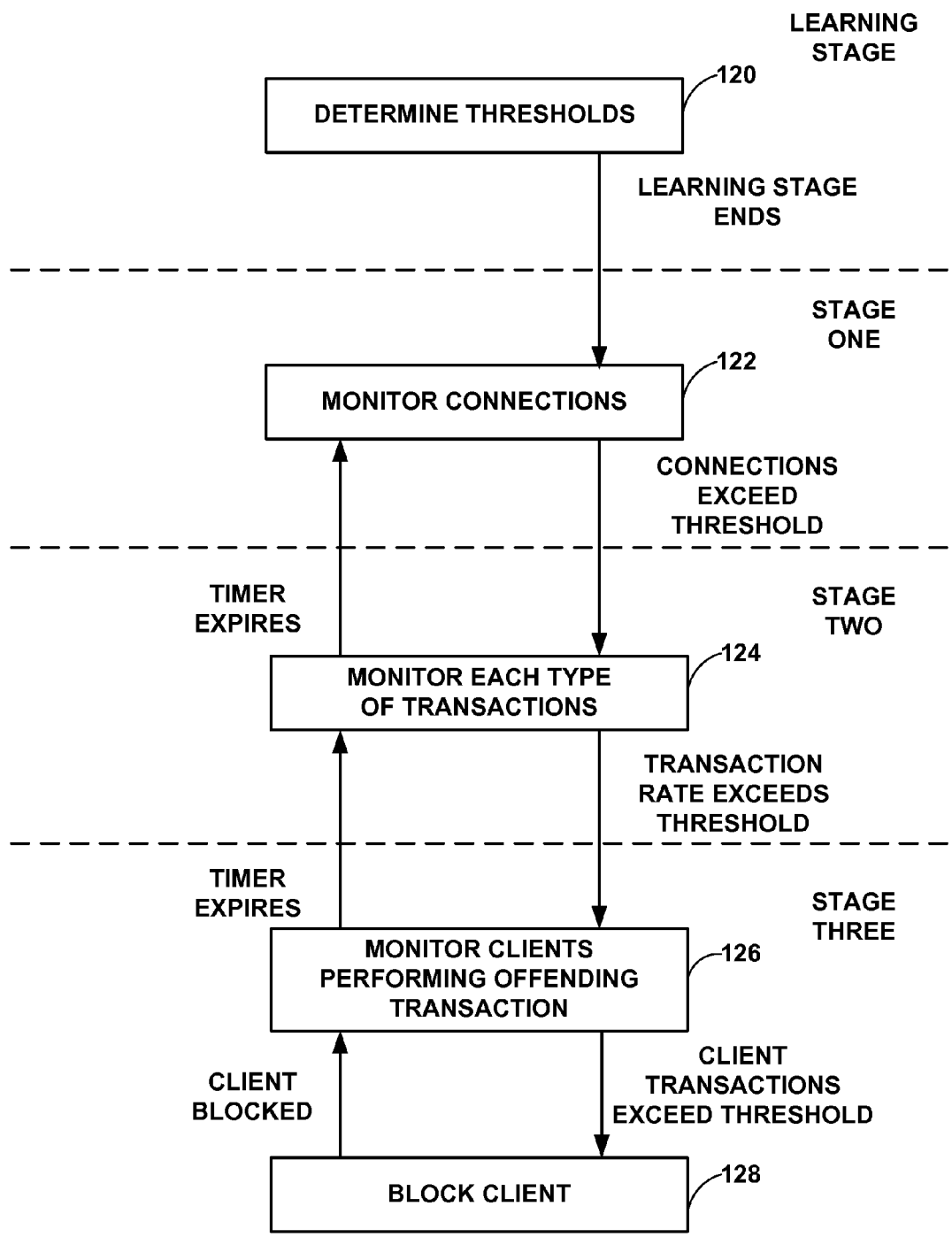
FIG. 7 is a state transition diagram illustrating an alternative view of a method for preventing network flood attacks.

FIG. 7 is a state transition diagram illustrating an alternative view of a method for preventing network flood attacks. FIG. 7 generally describes different states for IDP 20 while IDP 20 monitors traffic to nodes 8. Initially, IDP 20 begins in a learning stage, in which IDP 20 determines a connections threshold, a transaction-type threshold, and a client-transaction threshold (120). When the learning stage ends, e.g., after a predetermined learning stage time period, IDP 20 transitions to a connection monitoring state (122) corresponding to stage one, as described above. During the connection monitoring state, IDP 20 monitors a number and/or rate of active connections and connection requests and compares this to a corresponding connections threshold.

When the connections threshold is exceeded for a given resource (e.g., one of nodes 8 of FIG. 1, such), IDP 20 enters a transaction-type monitoring state (124) corresponding to stage two with respect to that node. In some examples, IDP 20 may transition to the transaction-type monitoring state for all connections, regardless of which of the one or more connections triggered the transition. Upon entering the transaction-type monitoring state, IDP 20 sets a timer for this state, and when the timer expires, IDP 20 transitions back to the connection monitoring state. During the transaction-type monitoring state, IDP 20 monitors each type of transaction for the node, such as a number of requests for each type of transaction. IDP 20 also compares requests for each type of transaction associated with the node to a corresponding transaction-type threshold.

When IDP 20 determines that a type of transaction exceeds the corresponding threshold (and thus is an offending type of transaction), IDP 20 transitions to a client-specific monitoring state for at least that type of transaction (126). In some examples, IDP 20 may transition to a client-specific monitoring state for all transaction types, regardless of which of the one or more transaction type triggered the transition. IDP 20 sets a timer for this state and transitions to the transaction-type monitoring state when the timer expires. IDP 20 generally determines a number of times each client performs the offending type of transaction in this state and compares this to a client-transaction threshold for the offending type of transaction.

In the example of FIG. 7, when IDP 20 determines that a client has performed the offending type of transaction in excess of the client-transaction threshold, IDP 20 blocks the client. In other examples, IDP 20 performs one or more other programmed responses as described above, such as dropping packets of the corresponding communication session, blocking future connection requests from the client, sending a close-session message to the client and/or server, rate limiting future sessions of the client, and advertising the client's IP address to cause another network device to block the client. After the client is blocked, IDP 20 returns to the client-monitoring state, and in some examples, IDP 20 resets the timer for this state after blocking the client.

In an example mode of operation, assume that the connections threshold is defined as 2,000 connections, that the transaction-type threshold for "example.com/get_shipping_cost," is defined as 250, and that the client-transaction threshold for "example.com/get_shipping_cost" is 2. After determining these example thresholds, IDP 20 may enter stage one in which IDP 20 monitors the connections. When IDP 20 determines that the number of connections with a node associated with example.com exceeds 2,000, IDP 20 transitions to the second stage with respect to the node associated with example.com, during which IDP 20 monitors each type of transaction occurring with the node associated with example.com. During this time, IDP 20 may continue to operate in stage one with respect to other nodes being monitored besides that associated with example.com. IDP 20 also continues to perform stage two monitoring with respect to the node associated with example.com, in addition to performing stage two monitoring with respect to this node.

When IDP 20 determines, during the second stage, that there have been over 250 requests for the transaction "example.com/get_shipping_cost," IDP 20 transitions to the third stage of analysis with respect to this transaction type, during which IDP 20 monitors each client performing "example.com/get_shipping_cost." During this time, IDP 20 may continue to operate in stage two with respect to other transaction types associated with example.com, also performing stage one monitoring for the node associated with example.com, and may continue to operate in stage one with respect to other nodes being monitored besides that associated with example.com.

When IDP 20 determines that a particular client, e.g., a client having IP address "1.1.1.1," is performing "example.com/get_shipping_cost" more than twice per time period in the third stage, IDP 20 identifies the client associated with IP address "1.1.1.1" as malicious and blocks some or all communications originating from IP address "1.1.1.1." IDP 20 may also perform the other programmed responses described in this disclosure with respect to IP address "1.1.1.1," such as sending a close-session message to IP address "1.1.1.1," advertising IP address "1.1.1.1" to other devices to cause the other devices to block communications from IP address "1.1.1.1," rate limiting future network sessions having "1.1.1.1" as a participant, or blocking future connection attempts from IP address "1.1.1.1." Even while blocking or performing other responses with respect to IP address "1.1.1.1," IDP 20 may continue to accept and process communications originating from other IP addresses that have not exceeded the client-transaction threshold. In this manner, IDP 20 may provide scalable, targeted security monitoring in an efficient manner, without compromising access to resources by normal, non-malicious clients.

As another example, assume that the service to be protected is DNS Server 10.10.10.1, and that a normal load is 500 requests/sec. The system keeps traffic statistics on DNS requests per second for the server at 10.10.10.1. When this rate exceeds 500 requests per second, the system transitions into Stage 2. During stage 2, for DNS the protocol field that identifies the domain name in the DNS query is configured for monitoring in this stage. The DNS protocol decoder generates the protocol field for a name query resource record, and the threshold is defined as 250 hits per tick, where a "tick" is defined as 30 seconds, in this example. In Stage 2, the top n values for the above protocol field are maintained together with a rate for each. If the rate exceeds the configured threshold (250 hits per 30 second time interval, in this example), the system will transition to Stage 3. In this example, let us say that xyz.com was the value for the record that exceeded 250 hits per 30 seconds. During stage 3, the abnormal value "xyz.com" for the record is monitored to identify the source IP addresses that are abusing the service. The signature is xyz.com (in the record). Assume that the client IP threshold is defined as 5 hits per minute (that is, 5 hits per 2-ticks, where a "tick" is again a 30 second time interval, in this example). In response, the IP Action is defined as block source IP for 5 minutes. So in this example, any client that exceeds 5 DNS requests to xyz.com in a minute is flagged and blocked from the network for 5 minutes.

Figure 8:
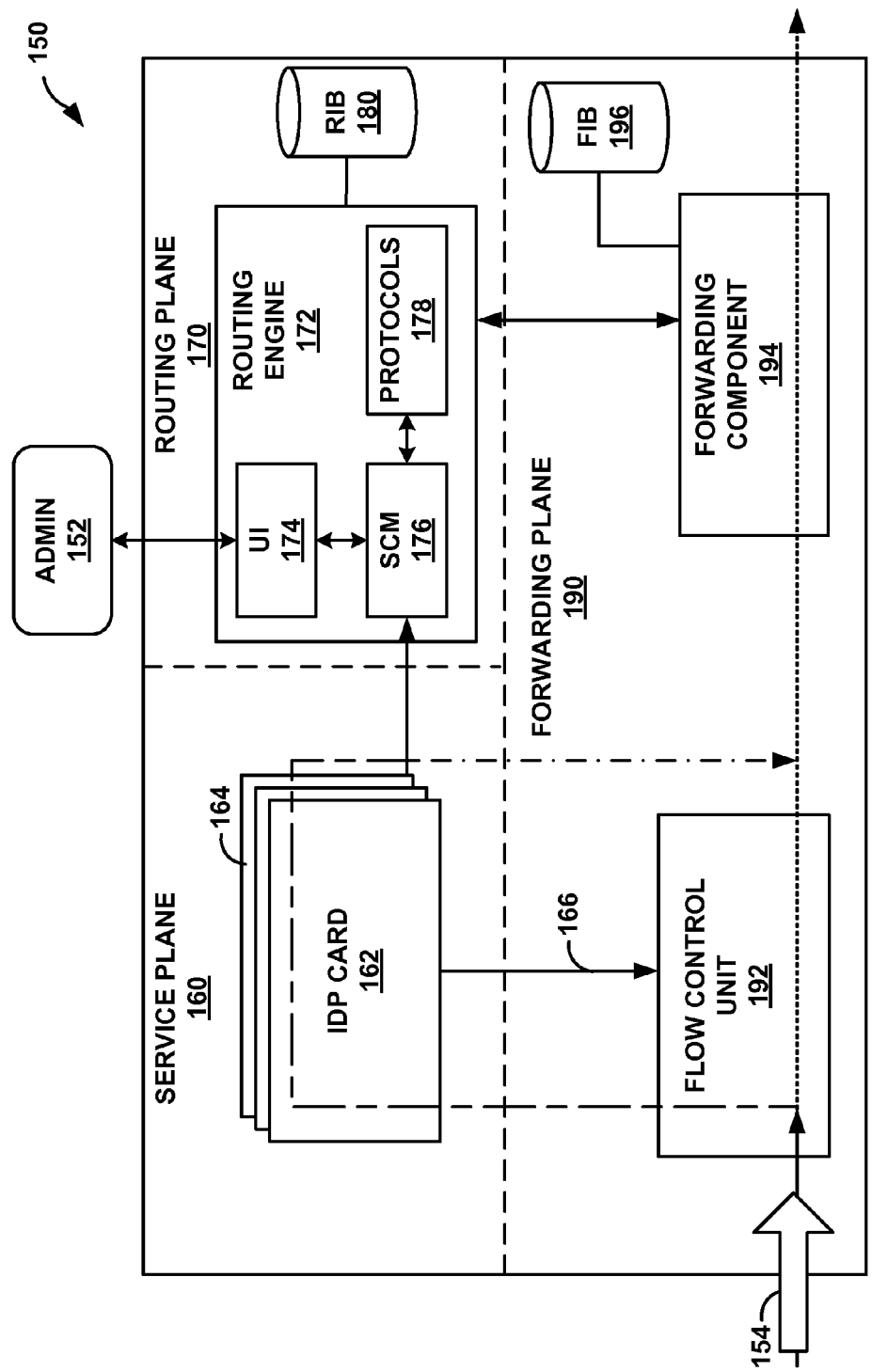
FIG. 8 is a block diagram illustrating an example router that includes interchangeable service cards, including an IDP card.

FIG. 8 is a block diagram illustrating an example router 150. In the example of FIG. 8, router 150 comprises distinct "planes" that perform different tasks for router 150. In general, router 150 includes forwarding plane 190 that receives and/or sends packets, routing plane 170 that is dedicated to routing functionality (such as calculating routes through a network), and service plane 160 that includes a plurality of service cards 164 that each perform various miscellaneous tasks for router 150. In general, service cards 164 may extend the functionality of router 150 to perform additional functions for router 150. Service cards 164 may be removed and replaced with other cards that perform other functions. In particular, service cards 164 include IDP card 162 that performs the techniques of this disclosure, namely prevention of network flood attacks.

In the example of FIG. 8, service plane cards 164 include IDP card 162 that generally performs the functions described with respect to IDP 20 (FIGS. 2 and 3). That is, IDP card 162 may include a control unit, computer-readable medium storing a connection threshold, a transaction-type threshold, and a client-transaction threshold, a reassembly module executing within the control unit to re-assemble application-layer data for the plurality of network sessions, and an attack detection module executing within the control unit to monitor connections for a plurality of network sessions to a protected network device, to monitor a plurality of types of transactions for the plurality of network sessions when the connections exceed the connection threshold, to monitor network addresses from which transactions of at least one of the plurality of types of transactions originate when the at least one of the plurality of types of transactions exceeds the transaction-type threshold, and to execute a programmed response with respect to at least one of the network addresses when the transactions of the at least one of the plurality of types of transactions originating from the at least one network address exceeds the client-transaction threshold. In this manner, the techniques of this disclosure are implemented in a network device other than a dedicated IDP, namely a router, in the example of FIG. 8. Service cards 164 may additionally include, for example, a firewall card, a security management card, a user interface card, an additional network interface, or other types of service cards. Service cards 164 may also include a single, generic service card that runs a plurality of security services, such as firewall, virtual private network, and intrusion detection and prevention, including the techniques of this disclosure.

Service cards 164 also send messages 166 to flow control unit 192. In one example, IDP card 162 sends messages 166 comprising instructions for a particular packet flow. That is, IDP card 162 may instruct flow control unit 192 to drop packets of a packet flow, to send a close session message to a client or a server of a packet flow, or to stop sending packets of a packet flow to IDP card 162 after determining that the packet flow is not malicious. Other service cards 164 may also send similar messages 166 to flow control unit 192. Flow control unit 192 may update filters based on the messages received from IDP card 162 and service cards 164.

Router 150 also includes routing plane 170 in which router 150 performs various routing tasks. For example, routing engine 172 of routing plane 170 calculates routes through a network to which router 150 is connected according to one or more protocols 178. Router 150 also receives advertised routes from other routers via service communication module (SCM) 176. Routing engine 172 stores advertised and calculated routes in routing information base (RIB) 180. Routing engine 172 also sends updates to forwarding component 194 according to advertised and calculated routes, such that forwarding component 194 may properly forward received packets along a route calculated by routing engine 172.

In the example of FIG. 8, routing engine 172 also includes user interface (UI) 174. UI 174 enables administrator (admin) 152 to interact with router 150, e.g., to add new protocols to protocols 178 or to update existing ones of protocols 178. For example, administrator 152 may add new routing protocols for routing engine 172. In some examples, administrator 152 configures service plane cards 164, such as IDP card 162, using UI 174. For example, UI 174 may present the example user interface of FIG. 5 to allow administrator 152 to configure IDP card 162, e.g., metrics and weightings thereof UI 174 also communicates received weights and metrics to IDP card 164 through service communication module 176.

Forwarding plane 190 generally receives and forwards packets for router 150. Flow control unit 192 receives packets 154 of various packet flows or other network sessions. When flow control unit 192 receives a message intended for routing engine 172, flow control unit 192 directs the message to routing engine 172, e.g., through one of service cards 164. Flow control unit 192 directs certain packets through one or more service cards 164. Flow control unit 192 may also send received packets directly to forwarding component 194. When IDP card 162 has sent a message 166 to flow control unit 192 to block packets of a particular packet flow, flow control unit 192 drops received packets 154 of that packet flow.

Forwarding component 194 also maintains forwarding information base (FIB) 196 according to messages received from routing engine 172. Forwarding component 194 forwards packets of a network session to another network device in accordance with FIB 196. When routing engine 172 advertises a route, forwarding component 194 forwards the advertised route to one or more other routers with which router 150 is in communication.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may be program instructions that cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising: monitoring, with a first network device, network connections to a second network device protected by the first network device; upon determining that a parameter associated with the monitored network connections exceeds a connection threshold, monitoring each of a plurality of types of transactions associated with the network connections, wherein monitoring each of the plurality of types of transactions comprises determining a rate at which transactions for each of the plurality of types of transactions is received as the parameter associated with the at least one of the plurality of types of transactions; upon determining that a parameter associated with at least one of the plurality of types of transactions exceeds a corresponding transaction-type threshold, monitoring communications associated with network addresses from which transactions of the at least one of the plurality of types of transactions originate, wherein determining that the parameter associated with the at least one of the plurality of types of transactions exceeds a transactions threshold comprises determining that the rate at which transactions of the at least one of the plurality of types of transactions exceeds the transaction-type threshold, wherein the transaction-type threshold defines a threshold rate at which transactions for the at least one of the plurality of types of transactions are to be received; and executing a programmed action with respect to at least one of the network addresses when the transactions of the at least one of the plurality of types of transactions originating from the at least one network address exceeds a corresponding client-transaction threshold.

2. The method of claim 1,
wherein monitoring the network connections comprises determining a number of network connections to the second network device as the parameter associated with the monitored network connections, and
wherein determining that the parameter associated with the monitored network connections exceed a connection threshold comprises determining that the number of network connections to the second network device exceeds the connection threshold, wherein the connection threshold defines a threshold number of simultaneous connections.

3. The method of claim 1,
wherein monitoring the connections comprises determining a rate at which connection requests for the second network device are received as the parameter associated with the monitored network connections, and
wherein determining that the parameter associated with the monitored network connections exceeds a connection threshold comprises determining that the rate at which the connection requests for the second network device are received exceeds the connection threshold, wherein the connection threshold defines a threshold rate of received connection requests.

4. The method of claim 1, wherein monitoring each of the plurality of types of transactions associated with the network connections comprises monitoring values of one or more protocol fields of the transactions.

5. The method of claim 1, wherein monitoring each of the plurality of types of transactions further comprises determining a number of transactions for each of the plurality of types of transactions over a period of time as a second parameter associated with the at least one of the plurality of types of transactions, and wherein determining that the second parameter associated with the at least one of the plurality of types of transactions exceeds a transactions threshold further comprises determining that the number of transactions for the at least one of the plurality of types of transactions exceeds the transaction-type threshold, wherein the transaction-type threshold defines a threshold number of transactions for the at least one of the plurality of types of transactions.

6. The method of claim 1,
wherein monitoring the communications associated with the network addresses comprises determining, for each of the network addresses, a number of transactions of the at least one of the plurality of types of transactions originating from the network address over a period of time, and
wherein executing the programmed action comprises executing the programmed action with respect to the at least one of the network addresses when the determined number of transactions for the at least one of the network addresses exceeds the client-transaction threshold, wherein the client-transaction threshold defines a threshold number of transactions of the at least one of the plurality of types of transactions for an individual client.

7. The method of claim 1, wherein executing the programmed action comprises one or more of blocking network connections of the at least one of the network addresses, dropping packets of a network connection associated with the at least one of the network addresses, blocking connection attempts originating from the at least one of the network addresses, advertising the at least one of the network addresses to a third network device to cause the third network device to block network connections of the at least one of the network addresses, sending a close-session message to the at least one of the network addresses, rate limiting future network sessions from at least one of the network addresses, and sending a close-session message to the second network device associated with the at least one of the network addresses.

8. The method of claim 1, further comprising:
  determining the connection threshold during a learning stage that occurs prior to monitoring the connections to the second network device;
  determining the transaction-type threshold during the learning stage; and
  determining the client-transaction threshold during the learning stage.

9. The method of claim 8, wherein determining the connection threshold comprises calculating at least one of an average number of concurrent connections during the learning stage, a number of connection requests received during the learning stage over one or more periods of time, and a rate at which the connection requests are received during the learning stage.

10. The method of claim 8, wherein determining the transaction-type threshold comprises calculating an average number of transactions for each of the plurality of types of transactions during the learning stage over one or more periods of time, and setting the transaction-type threshold based on the average number of transactions.

11. The method of claim 8, wherein determining the client-transaction threshold comprises calculating an average number of transactions for each of the plurality of types of transactions from individual clients during the learning stage, and setting the client-transaction threshold based on the average number of transactions.

12. The method of claim 1, wherein monitoring each of the plurality of types of transactions associated with the connections comprises:
  decoding packets of each of the plurality of types of transactions to extract application-layer data from the packets; and
  performing content inspection of the application-layer data from the packets.

13. A network device comprising: a network interface to receive packets of a plurality of network sessions to a protected network device; a computer-readable medium storing a connection threshold, a transaction-type threshold, and a client-transaction threshold; a control unit having one or more processors; a reassembly module executing within the control unit to re-assemble application-layer data for the plurality of network sessions; and an attack detection module executing within the control unit to monitor network connections for the plurality of network sessions to the protected network device, to monitor each of a plurality of types of transactions associated with the plurality of network sessions when a parameter associated with the monitored network connections exceeds the connection threshold, to determine a rate at which transactions for each of the plurality of types of transactions is received as the parameter associated with the at least one of the plurality of types of transactions, to monitor communications associated with network addresses from which transactions of at least one of the plurality of types of transactions originate when a parameter associated with the at least one of the plurality of types of transactions exceeds the transaction-type threshold, to determine that the parameter associated with the at least one of the plurality of types of transactions exceeds the transaction-type threshold when the rate at which transactions of the at least one of the plurality of types of transactions exceeds the transaction-type threshold, wherein the transaction-type threshold defines a threshold rate at which transactions for the at least one of the plurality of types of transactions are to be received, and to execute a programmed action with respect to at least one of the network addresses when the transactions of the at least one of the plurality of types of transactions originating from the at least one network address exceeds the client-transaction threshold.

14. The network device of claim 13, wherein to monitor the connections, the attack detection module calculates the parameter associated with the monitored network connections as a number of connections to the protected network device and determines whether the number of connections to the protected network device exceeds the connection threshold.

15. The network device of claim 13, wherein to monitor the connections, the attack detection module calculates the parameter associated with the monitored network connections as a rate at which connection requests for the protected network device are received and determines whether the rate exceeds the connection threshold.

16. The network device of claim 13, wherein to monitor the plurality of types of transactions, the attack detection module calculates the parameter associated with the at least one of the plurality of types of transactions as a number of requests for each of the types of transactions over a period of time and determines whether the number exceeds the transaction-type threshold.

17. The network device of claim 13, wherein to monitor the network addresses, the attack detection module calculates a number of times a request for the at least one of the plurality of types of transactions is received from each of the network addresses over a period of time and determines whether the number exceeds the client-transaction threshold.

18. The network device of claim 13, further comprising a threshold learning module to determine the connection threshold during a learning stage that occurs prior to monitoring the network connections to the protected network device, to determine the transaction-type threshold during the learning stage, to determine the client-transaction threshold during the learning stage, and to record the connection threshold, the transaction-type threshold, and the client-transaction threshold in the computer-readable medium.

19. The network device of claim 18, wherein the threshold learning module calculates the connection threshold according to at least one of an average number of concurrent connections during the learning stage, a number of connection requests received during the learning stage, and a rate at which the connection requests are received during the learning stage, wherein the threshold learning module calculates the transaction-type threshold as an average number of transactions for each of the plurality of types of transactions during the learning stage, and wherein the threshold learning module calculates the client-transaction threshold as an average number of transactions for each of the plurality of types of transactions from individual clients during the learning stage.

20. The network device of claim 13, wherein the programmed action comprises one or more of blocking network connections of the at least one of the network addresses, dropping packets of a network connection associated with the at least one of the network addresses, blocking connection attempts originating from the at least one of the network addresses, advertising the at least one of the network addresses to a third network device to cause the third network device to block network connections of the at least one of the network addresses, sending a close-session message to the at least one of the network addresses, rate limiting future network sessions of at least one of the network addresses, and sending a close-session message to the protected network device associated with the at least one of the network addresses.

21. A system comprising: a protected network device; a plurality of client devices, wherein each of the plurality of client devices participate in one of a plurality of network sessions with the protected network device; and a network security device positioned between the protected network device and the plurality of client devices, wherein the network security device comprises: a network interface to receive packets of the plurality of network sessions; a computer-readable medium storing a connection threshold, a transaction-type threshold, and a client-transaction threshold; a control unit having one or more processors; a reassembly module executing within the control unit to re-assemble application-layer data for the plurality of network sessions; and an attack detection module executing within the control unit to monitor network connections for the plurality of network sessions to the protected network device, to monitor each of a plurality of types of transactions associated with the plurality of network sessions when a parameter associated with the monitored network connections exceeds the connection threshold, to determine a rate at which transactions for each of the plurality of types of transactions is received as the parameter associated with the at least one of the plurality of types of transactions, to monitor communications associated with network addresses from which transactions of at least one of the plurality of types of transactions originate when a parameter associated with the at least one of the plurality of types of transactions exceeds the transaction-type threshold, to determine that the parameter associated with the at least one of the plurality of types of transactions exceeds the transaction-type threshold when the rate at which transactions of the at least one of the plurality of types of transactions exceeds the transaction-type threshold, wherein the transaction-type threshold defines a threshold rate at which transactions for the at least one of the plurality of types of transactions are to be received, and to execute a programmed action with respect to at least one of the network addresses when the transactions of the at least one of the plurality of types of transactions originating from the at least one network address exceeds the client-transaction threshold.

22. A non-transitory computer-readable storage medium encoded with instructions for causing a programmable processor to: monitor network connections to a protected network device; upon determining that a parameter associated with the connections exceeds a connection threshold, monitor each of a plurality of types of transactions associated with the network connections, wherein the instructions to monitor each of the plurality of types of transactions comprise instructions to determine a rate at which transactions for each of the plurality of types of transactions is received as the parameter associated with the at least one of the plurality of types of transactions; upon determining that a parameter associated with the at least one of the plurality of types of transactions exceeds a corresponding transaction-type threshold, monitor communications associated with network addresses from which transactions of the at least one of the plurality of types of transactions originate, wherein the instructions to determine that the parameter associated with the at least one of the plurality of types of transactions exceeds a transactions threshold comprise instructions to determine that the rate at which transactions of the at least one of the plurality of types of transactions exceeds the transaction-type threshold, wherein the transaction-type threshold defines a threshold rate at which transactions for the at least one of the plurality of types of transactions are to be received; and execute a programmed action with respect to at least one of the network addresses when the transactions of the at least one of the plurality of types of transactions originating from the at least one network address exceeds a corresponding client-transaction threshold.

23. The non-transitory computer-readable medium of claim 22,
wherein the instructions to monitor the network connections comprise instructions to determine a number of connections to the second network device as the parameter associated with the monitored network connections, and
wherein the instructions to determine that the parameter associated with the monitored network connections exceeds a connection threshold comprise instructions to determine that the number of connections exceeds the connection threshold, wherein the connection threshold defines a threshold number of simultaneous connections.

24. The non-transitory computer-readable medium of claim 22,
wherein the instructions to monitor the network connections comprise instructions to determine a rate of received connection requests for the second network device as the parameter associated with the monitored network connections, and
wherein the instructions to determine that the parameter associated with the monitored network connections exceed a connection threshold comprise instructions to determine that the rate at which the connection requests are received exceeds the connection threshold, wherein the connection threshold defines a threshold rate of received connection requests.

25. The non-transitory computer-readable medium of claim 22,
wherein the instructions to monitor each of the plurality of types of transactions comprise instructions to determine a number of transactions for each of the plurality of types of transactions over a period of time as the parameter associated with the at least one of the plurality of types of transactions, and
wherein the instructions to determine that the parameter associated with the at least one of the plurality of types of transactions exceeds a transactions threshold comprise instructions to determine that the number of transactions for the at least one of the plurality of types of transactions exceeds the transaction-type threshold, wherein the transaction-type threshold defines a threshold number of transactions for the at least one of the plurality of types of transactions.

* * * * *